(12) United States Patent
Jin et al.

(10) Patent No.: US 12,088,384 B2
(45) Date of Patent: Sep. 10, 2024

(54) PRECODING MATRIX INDICATING AND DETERMINING METHOD AND COMMUNICATIONS APPARATUS

(71) Applicant: HUAWEI TECHNOLOGIES CO., LTD., Guangdong (CN)

(72) Inventors: Huangping Jin, Shanghai (CN); Xiaohan Wang, Shanghai (CN); Xiaoyan Bi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 295 days.

(21) Appl. No.: 17/513,905

(22) Filed: Oct. 29, 2021

(65) Prior Publication Data
US 2022/0052740 A1     Feb. 17, 2022

Related U.S. Application Data

(63) Continuation of application No. PCT/CN2020/086601, filed on Apr. 24, 2020.

(30) Foreign Application Priority Data

Apr. 30, 2019  (CN) .................. 201910364278.X

(51) Int. Cl.
H04B 7/06     (2006.01)

(52) U.S. Cl.
CPC ......... *H04B 7/0639* (2013.01); *H04B 7/0626* (2013.01); *H04B 7/0634* (2013.01)

(58) Field of Classification Search
CPC ...... H04B 7/0456; H04B 7/06; H04B 7/0617; H04B 7/0452; H04B 7/0848;
(Continued)

(56) References Cited

U.S. PATENT DOCUMENTS

| 8,625,632 | B2 * | 1/2014 | Roman | H04B 7/0452 |
| | | | | 370/468 |
| 10,938,497 | B2 * | 3/2021 | Parkvall | H04L 5/0053 |

(Continued)

FOREIGN PATENT DOCUMENTS

| CN | 107370525 A | 11/2017 |
| CN | 109309518 A | 2/2019 |

(Continued)

OTHER PUBLICATIONS

CATT: "Discussions on Type II CSI enhancement", 3GPP Draft; R1-1904560, Apr. 7, 2019, total 12 pages.

(Continued)

*Primary Examiner* — Jung Liu
(74) *Attorney, Agent, or Firm* — Gregg Jansen

(57) ABSTRACT

This application provides a precoding matrix indicating and determining method and a communications apparatus. The method includes: generating, by a terminal device, first indication information, and sending the first indication information to a network device, where the first indication information indicates a spatial domain vector, a frequency domain vector, and a weighting coefficient that are used to construct a precoding matrix. When a value of a rank Z is greater than 2, Z transport layers include at least one first-type transport layer, and a maximum quantity $M_1$ of frequency domain vectors reported for the first-type transport layer satisfies:

$$M_1 = \left\lfloor p_1 \times \frac{N_3}{R} \right\rfloor,$$

wherein $p_1$ is a preconfigured coefficient for determining the maximum quantity of frequency domain vectors reported for (Continued)

the first-type transport layer, $1 \geq p_1 \geq 0$, R is a preconfigured value, $N_3$ is a length of a frequency domain vector, $Z>2$, and R, $N_3$, and Z are all positive integers.

24 Claims, 4 Drawing Sheets

(58) Field of Classification Search
CPC . H04W 28/0289; H04W 88/085; H04W 8/18; H04W 4/00; H04W 48/12; H04W 80/02; H04W 48/16; H04W 74/0833; H04W 74/02; H04W 60/04; H04W 8/24; H04W 74/0816; H04W 72/12; H04L 69/04; H04L 5/0053; H04L 65/1023; H04L 5/1469; H04L 5/0007; H04L 5/0091; H04L 5/0028; H04J 3/1682; H04J 11/0079
See application file for complete search history.

(56) References Cited

U.S. PATENT DOCUMENTS

| | | | | |
|---|---|---|---|---|
| 2018/0227028 | A1* | 8/2018 | Lee | H04B 7/0456 |
| 2022/0006500 | A1* | 1/2022 | Wei | H04B 7/0626 |
| 2023/0038585 | A1* | 2/2023 | Tsui | H04W 52/143 |
| 2023/0109947 | A1* | 4/2023 | Parkvall | H04J 11/0056 455/418 |
| 2023/0224059 | A1* | 7/2023 | Parkvall | H04W 8/18 370/321 |

FOREIGN PATENT DOCUMENTS

| | | |
|---|---|---|
| CN | 109391312 A | 2/2019 |
| KR | 20100136418 A | 12/2010 |
| WO | 2014134876 A1 | 9/2014 |
| WO | 2018199625 A1 | 11/2018 |
| WO | 2018201447 A1 | 11/2018 |

OTHER PUBLICATIONS

Qualcomm Incorporated: "CSI Enhancement for MU-MIMO Support", 3GPP Draft; R1-1903042 ,Feb. 16, 2019,total 15 pages.
Motorola Mobility, Addition of new MAC UL TBS test case with transform precoding configured, 3GPP TSG-RAN WG5 Meeting #80, R5-184528, Gothenburg, Sweden, Aug. 20-24, 2018, 12 pages.
Ericsson, "On CSI enhancements for MU-MIMO", 3GPP TSG RAN WG1 Meeting RAN1#96bis R1-1905519,Apr. 8, 2019,total 13 pages.
Vivo, "Further discussion on type II CSI compression and feedback for high rank extension", 3GPP TSG RAN WG1#96bis R1-1904095,Mar. 30, 2019,total 6 pages.
Samsung, "Feature lead summary for MU-MIMO CSI revision on selected issues", 3GPP TSG RAN WG1#96bis R1-1905629,Apr. 8, 2019,total 17 pages.

* cited by examiner

PRECODING MATRIX INDICATING AND DETERMINING METHOD AND COMMUNICATIONS APPARATUS

CROSS-REFERENCE TO RELATED APPLICATIONS

This application is a continuation of International Application No. PCT/CN2020/086601, filed on Apr. 24, 2020, which claims priority to Chinese Patent Application No. 201910364278.X, filed on Apr. 30, 2019. The disclosures of the aforementioned applications are hereby incorporated by reference in their entireties.

TECHNICAL FIELD

This application relates to the communications field, and more specifically, to a precoding matrix indicating and determining method and a communications apparatus.

BACKGROUND

In a massive multiple-input multiple-output (Massive MIMO) technology, a network device may reduce interference between a plurality of users and interference between a plurality of signal streams of a same user by using a precoding technology. In this way, signal quality is improved, space division multiplexing is implemented, and spectrum utilization is improved.

For example, a terminal device may determine, through channel measurement or the like, a precoding vector that is adapted to a downlink channel, and feed back the precoding vector, so that the network device obtains a precoding vector that is the same as or similar to the precoding vector determined by the terminal device. To reduce feedback overheads and improve feedback precision, in an implementation, the terminal device may indicate the precoding vector to the network device in a feedback manner of combining spatial domain compression with frequency domain compression. The terminal device may perform fitting on the precoding vector based on a precoding vector of each frequency domain unit on each transport layer through weighting of at least one spatial domain vector and at least one frequency domain vector. The terminal device may feed back a selected spatial domain vector, a selected frequency domain vector, and a corresponding weighting coefficient to the network device, so that the network device restores, by using a weighted sum of a matrix constructed by using the spatial domain vector and the frequency domain vector, the precoding vector corresponding to each frequency domain unit on each transport layer.

To improve spectrum resource utilization and improve a data transmission capability of a communications system, the network device may transmit data to the terminal device on a plurality of transport layers. As a quantity of transport layers increases, feedback overheads increase.

SUMMARY

Embodiments of this application provides a precoding matrix indicating and determining method and a communications apparatus, to reduce feedback overheads.

According to a first aspect, a precoding matrix indicating method is provided. The method may be performed by a terminal device, or may be performed by a chip disposed in the terminal device. This is not limited in the embodiments of this application.

The method includes: generating first indication information, where the first indication information is used to indicate a spatial domain vector, a frequency domain vector, and a weighting coefficient that are used to construct a precoding matrix; and when a value of a rank Z is greater than 2, Z transport layers include at least one first-type transport layer, and a maximum quantity $M_1$ of frequency domain vectors reported for the first-type transport layer satisfies:

$$M_1 = \left\lfloor p_1 \times \frac{N_3}{R} \right\rfloor,$$

where $p_1$ is a preconfigured coefficient and is used to determine the maximum quantity of frequency domain vectors reported for the first-type transport layer, $1 \geq p_1 > 0$, R is a preconfigured value, $N_3$ is a length of a frequency domain vector, $Z > 2$, $1 \leq z \leq Z$, and z, R, $N_3$, and Z are all positive integers; and sending the first indication information.

According to a second aspect, a precoding matrix determining method is provided. The method may be performed by a network device, or may be performed by a chip disposed in the network device. This is not limited in the embodiments of this application.

The method includes: receiving first indication information, where the first indication information is used to indicate a frequency domain vector, a spatial domain vector, and a weighting coefficient that are used to construct a precoding matrix; and when a value of a rank Z is greater than 2, Z transport layers include at least one first-type transport layer, and a maximum quantity $M_1$ of frequency domain vectors reported for the first-type transport layer satisfies:

$$M_1 = \left\lfloor p_1 \times \frac{N_3}{R} \right\rfloor,$$

where $p_1$ is a preconfigured coefficient and is used to determine the maximum quantity of frequency domain vectors reported for the first-type transport layer, $1 \geq p_1 > 0$, R is a preconfigured value, $N_3$ is a length of a frequency domain vector, $Z > 2$, $1 \leq z \leq Z$, and z, R, $N_3$, and Z are all positive integers; and determining precoding matrices of one or more frequency domain units according to the first indication information.

Therefore, in this embodiment of this application, the first-type transport layer is defined, and maximum quantities of frequency domain vectors and maximum quantities of weighting coefficients that are reported for some transport layers in a high-rank codebook are reduced. Overall, a quantity of frequency domain vectors and a quantity of weighting coefficients that are fed back by the terminal device are reduced, and therefore feedback overheads are reduced. In addition, some of the Z transport layers (for example, one or more of the Z transport layers) are defined as first-type transport layers, and more frequency domain vectors and more weighting coefficients can still be reported for some other transport layers, so that relatively high feedback precision can still be ensured. Therefore, tradeoff efficiency between the feedback overheads and the feedback precision is relatively high.

With reference to the first aspect or the second aspect, in an implementation, the Z transport layers further include at least one second-type transport layer, and a maximum quantity $M_2$ of frequency domain vectors reported for the second-type transport layer satisfies:

$$M_2 = \left\lceil p_2 \times \frac{N_3}{R} \right\rceil \text{ or } M_2 = \left\lfloor p_2 \times \frac{N_3}{R} \right\rfloor,$$

where $p_2$ is a preconfigured coefficient and is used to determine the maximum quantity of frequency domain vectors reported for the second-type transport layer, and $1 \geq p_2 > p_1 > 0$.

In other words, transport layers may be classified into the first-type transport layer and the second-type transport layer based on different values of a coefficient p. The value $p_1$ that is of the coefficient p and that is configured by the network device for the first-type transport layer is less than the value $p_2$ that is of the coefficient p and that is configured for the second-type transport layer.

With reference to the first aspect or the second aspect, in an implementation, $p_1$ and $p_2$ are taken from a plurality of preconfigured optional values, the plurality of preconfigured optional values include $p_{0,1}$ and $p_{0,2}$, and $0 < p_{0,1} < p_{0,2} \leq 1$.

For example, $p_{0,1}$ and $p_{0,2}$ may be taken from a plurality of values predefined in a protocol. The network device may select two values from the plurality of predefined values for parameter configuration of current CSI reporting.

With reference to the first aspect or the second aspect, in an implementation, $p_1$ and $p_2$ are taken from a plurality of preconfigured optional values, the plurality of preconfigured optional values include $p_{0,1}$, $p_{0,2}$, and $p_{0,3}$, and $0 < p_{0,1} < p_{0,3} < p_{0,2} \leq 1$.

For example, $p_{0,1}$, $p_{0,2}$, and $p_{0,3}$ may be taken from a plurality of values predefined in a protocol. The network device may select three values from the plurality of predefined values for parameter configuration of current CSI reporting.

With reference to the first aspect or the second aspect, in an implementation, $p_1 = p_{0,1}$ and $p_2 = p_{0,2}$; and the maximum quantity $M_1$ of frequency domain vectors reported for the first-type transport layer satisfies:

$$M_1 = \left\lfloor p_{0,1} \times \frac{N_3}{R} \right\rfloor,$$

and the maximum quantity $M_2$ of frequency domain vectors reported for the second-type transport layer satisfies:

$$M_2 = \left\lceil p_{0,2} \times \frac{N_3}{R} \right\rceil.$$

That is, a transport layer for which the coefficient p is configured as a relatively small value is a first-type transport layer, and a maximum quantity of reported frequency domain vectors corresponding to the first-type transport layer may be determined by performing rounding down on $$p \times \frac{N_3}{R};$$

and a transport layer for which the coefficient p is configured as a relatively large value is a second-type transport layer, and a maximum quantity of reported frequency domain vectors corresponding to the second-type transport layer may be determined by performing rounding up on $$p \times \frac{N_3}{R}.$$

With reference to the first aspect or the second aspect, in an implementation, $p_1 = p_{0,1}$ and $p_2 = p_{0,3}$; and the maximum quantity $M_1$ of frequency domain vectors reported for the first-type transport layer satisfies:

$$M_1 = \left\lfloor p_{0,1} \times \frac{N_3}{R} \right\rfloor,$$

and the maximum quantity $M_2$ of frequency domain vectors reported for the second-type transport layer satisfies:

$$M_2 = \left\lceil p_{0,3} \times \frac{N_3}{R} \right\rceil \text{ or } M_2 = \left\lfloor p_{0,3} \times \frac{N_3}{R} \right\rfloor.$$

When three or more values are configured for the coefficient p, a transport layer for which the coefficient p is configured as a minimum value is a first-type transport layer, and a maximum quantity of reported frequency domain vectors corresponding to the first-type transport layer may be determined by performing rounding down on $$p \times \frac{N_3}{R};$$

and a transport layer for which the coefficient p is configured as an intermediate value may be defined as a first-type transport layer or a second-type transport layer, and a maximum quantity of reported frequency domain vectors corresponding to the first-type transport layer or the second-type transport layer may be determined by performing rounding down or rounding up on $$p \times \frac{N_3}{R}.$$

With reference to the first aspect or the second aspect, in an implementation, the Z transport layers further include at least one second-type transport layer, and a maximum quantity $M_2$ of frequency domain vectors reported for the second-type transport layer satisfies:

$$M_2 = \left\lceil p_2 \times \frac{N_3}{R} \right\rceil,$$

where $p_2$ is a preconfigured coefficient and is used to determine the maximum quantity of frequency domain vectors reported for the second-type transport layer, and $1 \leq p_2 \geq p_1 > 0$.

In this implementation, the first-type transport layer and the second-type transport layer are distinguished without depending on a value of the coefficient p. For example, the first-type transport layer may be defined as an unimportant layer in the Z transport layers, and the second-type transport layer may be defined as a relatively important layer in the Z transport layers. For another example, transport layers separately included in the first-type transport layer and the second-type transport layer may be predefined, for example, predefined in a protocol.

With reference to the first aspect or the second aspect, in an implementation, $p_1$ and $p_2$ are taken from one or more preconfigured optional values, the one or more preconfigured optional values include one or more of $p_{0,1}$, $p_{0,2}$ and $p_{0,3}$, and $0<p_{0,1}<p_{0,3}<p_{0,2}\leq 1$.

In this implementation, the coefficient p having a same value may be configured for the first-type transport layer and the second-type transport layer, or the coefficient p having different values may be configured for the first-type transport layer and the second-type transport layer. This is not limited in the embodiments of this application. In addition, the maximum quantity of frequency domain vectors reported for the first-type transport layer may be determined by performing rounding down on $$p \times \frac{N_3}{R};$$

and the maximum quantity of frequency domain vectors reported for the second-type transport layer may be determined by performing rounding up on $$p \times \frac{N_3}{R}.$$

The following lists implementations of classifying the Z transport layers into the first-type transport layer and the second-type transport layer.

In an implementation, the Z transport layers all belong to the first-type transport layer.

In another implementation, a $Z^{th}$ transport layer in the Z transport layers belongs to the first-type transport layer, and the first transport layer in the Z transport layers belongs to the second-type transport layer.

Optionally, Z is 3, the first transport layer in three transport layers belongs to the second-type transport layer, and the second transport layer and the third transport layer in the three transport layers belong to the first-type transport layer.

Optionally, Z is 3, the first transport layer and the second transport layer in three transport layers belong to the second-type transport layer, and the third transport layer in the three transport layers belongs to the first-type transport layer.

Optionally, Z is 4, the first transport layer and the second transport layer in four transport layers belong to the second-type transport layer, and the third transport layer and the fourth transport layer in the four transport layers belong to the first-type transport layer.

Optionally, Z is 4, the first transport layer in four transport layers belongs to the second-type transport layer, and the second transport layer, the third transport layer, and the fourth transport layer in the four transport layers belong to the first-type transport layer.

It should be understood that the foregoing listed values of the rank and transport layers separately included in the first-type transport layer and the second-type transport layer are merely examples, and should not constitute any limitation on the embodiments of this application. Based on a same conception, a person skilled in the art may define some or all of the transport layers as the first-type transport layer when the rank is any value greater than 2, and determine, in the foregoing manner, the maximum quantity of frequency domain vectors reported for the first-type transport layer.

According to a third aspect, a communications apparatus is provided, including the modules or units configured to perform the method in any one of the first aspect and the implementations of the first aspect.

The communications apparatus may include a processing unit and a transceiver unit. The processing unit is configured to generate first indication information, where the first indication information is used to indicate a spatial domain vector, a frequency domain vector, and a weighting coefficient that are used to construct a precoding matrix; and when a value of a rank Z is greater than 2, Z transport layers include at least one first-type transport layer, and a maximum quantity $M_1$ of frequency domain vectors reported for the first-type transport layer satisfies:

$$M_1 = \left\lfloor p_1 \times \frac{N_3}{R} \right\rfloor,$$

where $p_1$ is a preconfigured coefficient and is used to determine the maximum quantity of frequency domain vectors reported for the first-type transport layer, $1 \geq p_1 > 0$, R is a preconfigured value, $N_3$ is a length of a frequency domain vector, $Z>2$, $1 \leq z \leq Z$, and z, R, $N_3$, and Z are all positive integers. The transceiver unit is configured to send the first indication information.

According to a fourth aspect, a communications apparatus is provided, including the modules or units configured to perform the method in any one of the second aspect and the implementations of the second aspect.

The communications apparatus may include a processing unit and a transceiver unit. The transceiver unit is configured to receive first indication information, where the first indication information is used to indicate a spatial domain vector, a frequency domain vector, and a weighting coefficient that are used to construct a precoding matrix; and when a value of a rank Z is greater than 2, Z transport layers include at least one first-type transport layer, and a maximum quantity $M_1$ of frequency domain vectors reported for the first-type transport layer satisfies:

$$M_1 = \left\lfloor p_1 \times \frac{N_3}{R} \right\rfloor,$$

where $p_1$ is a preconfigured coefficient and is used to determine the maximum quantity of frequency domain vectors reported for the first-type transport layer, $1 \geq p_1 > 0$, R is a preconfigured value, $N_3$ is a length of a frequency domain vector, $Z>2$, $1 \leq z \leq Z$, and z, R, $N_3$, and Z are all positive integers. The processing unit is configured to determine precoding matrices of one or more frequency domain units according to the first indication information.

According to a fifth aspect, a communications apparatus is provided, including a processor. The processor is coupled to a memory, and may be configured to execute instructions in the memory, to implement the method in any one of the first aspect and the implementations of the first aspect. Optionally, the communications apparatus further includes a memory. Optionally, the communications apparatus further includes a communications interface, and the processor is coupled to the communications interface.

In an implementation, the communications apparatus is a terminal device. When the communications apparatus is a terminal device, the communications interface may be a transceiver or an input/output interface.

In another implementation, the communications apparatus is a chip disposed in a terminal device. When the communications apparatus is a chip disposed in a terminal device, the communications interface may be an input/output interface.

Optionally, the transceiver may be a transceiver circuit. Optionally, the input/output interface may be an input/output circuit.

According to a sixth aspect, a communications apparatus is provided, including a processor. The processor is coupled to a memory, and may be configured to execute instructions in the memory, to implement the method in any one of the second aspect and the implementations of the second aspect. Optionally, the communications apparatus further includes a memory. Optionally, the communications apparatus further includes a communications interface, and the processor is coupled to the communications interface.

In an implementation, the communications apparatus is a network device. When the communications apparatus is a network device, the communications interface may be a transceiver or an input/output interface.

In another implementation, the communications apparatus is a chip disposed in a network device. When the communications apparatus is a chip disposed in a network device, the communications interface may be an input/output interface.

Optionally, the transceiver may be a transceiver circuit. Optionally, the input/output interface may be an input/output circuit.

According to a seventh aspect, a processor is provided, including an input circuit, an output circuit, and a processing circuit. The processing circuit is configured to receive a signal by using the input circuit and transmit a signal by using the output circuit, so that the processor is enabled to perform the method in any one of the first aspect to the second aspect and the implementations of the first aspect to the second aspect.

In an implementation, the processor may be one or more chips, the input circuit may be an input pin, the output circuit may be an output pin, and the processing circuit may be a transistor, a gating circuit, a flip-flop, various logic circuits, and the like. An input signal received by the input circuit may be received and input by, for example, but not limited to, a receiver, and a signal output by the output circuit may be output to and transmitted by, for example, but not limited to, a transmitter. The input circuit and the output circuit may be a same circuit, and the circuit is separately used as the input circuit and the output circuit at different moments. Implementations of the processor and various circuits are not limited in this embodiment of this application.

According to an eighth aspect, a processing apparatus is provided, including a processor and a memory. The processor is configured to read instructions stored in the memory, and may receive a signal by using a receiver and transmit a signal by using a transmitter, to perform the method in any one of the first aspect to the second aspect and the implementations of the first aspect to the second aspect.

Optionally, there are one or more processors, and there are one or more memories.

Optionally, the memory may be integrated with the processor, or the memory and the processor are separately disposed.

In an implementation, the memory may be a non-transitory memory, for example, a read-only memory (ROM). The memory and the processor may be integrated into a same chip, or may be separately disposed on different chips. A type of the memory and a manner of disposing the memory and the processor are not limited in this embodiment of this application.

It should be understood that in a related data interaction process, for example, sending of indication information may be a process of outputting the indication information from the processor, and receiving of capability information may be a process of receiving input capability information by the processor. Data output by the processor may be output to the transmitter, and input data received by the processor may be from the receiver. The transmitter and the receiver may be collectively referred to as a transceiver.

The processing apparatus in the eighth aspect may be one or more chips. The processor in the processing apparatus may be implemented by hardware, or may be implemented by software. When the processor is implemented by hardware, the processor may be a logic circuit, an integrated circuit, or the like. When the processor is implemented by software, the processor may be a general-purpose processor, and is implemented by reading software code stored in the memory. The memory may be integrated into the processor, or may be located outside the processor and exist independently.

According to a ninth aspect, a computer program product is provided. The computer program product includes a computer program (also referred to as code or instructions), and when the computer program is run, a computer is enabled to perform the method in any one of the first aspect to the second aspect and the implementations of the first aspect to the second aspect.

According to a tenth aspect, a computer-readable medium is provided. The computer-readable medium stores a computer program (also referred to as code or instructions), and when the computer program is run on a computer, the computer is enabled to perform the method in any one of the first aspect to the second aspect and the implementations of the first aspect to the second aspect.

According to an eleventh aspect, a communications system is provided, including the foregoing network device and the foregoing terminal device.

DESCRIPTION OF EMBODIMENTS

The following describes technical solutions of the embodiments of this application with reference to accompanying drawings.

The technical solutions in the embodiments of this application may be applied to various communications systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system or a new radio (NR) system, and a vehicle-to-X (V2X) system, where V2X may include vehicle to network (V2N), vehicle to vehicle (V2V), vehicle to infrastructure (V2I), vehicle to pedestrian (V2P), long term evolution-vehicle (LTE-V), internet of vehicles, machine type communication (MTC), internet of things (IoT), long term evolution-machine (LTE-M), machine to machine (M2M), and the like.

Figure 1:
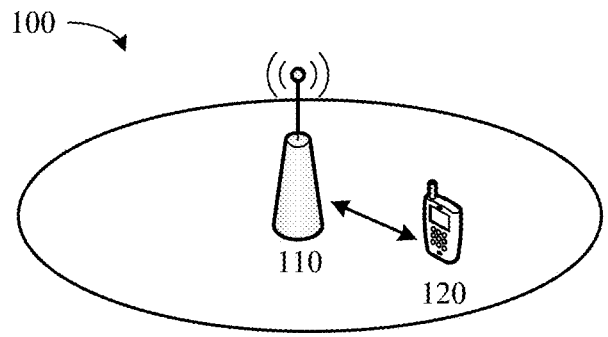
FIG. 1 is a diagram of a communications system to which a precoding matrix indicating and determining method is applied according to an embodiment of this application.

To facilitate understanding of the embodiments of this application, a communications system shown in FIG. 1 is first used as an example to describe in detail a communications system to which the embodiments of this application are applied. FIG. 1 is a diagram of a communications system 100 to which a precoding matrix indicating and determining method is applied according to an embodiment of this application. As shown in FIG. 1, the communications system 100 may include at least one network device, for example, a network device 110 shown in FIG. 1. The communications system 100 may further include at least one terminal device, for example, a terminal device 120 shown in FIG. 1. The network device 110 may communicate with the terminal device 120 over a wireless link. A plurality of antennas may be configured for each communications device, such as the network device 110 or the terminal device 120. For each communications device in the communications system 100, the plurality of configured antennas may include at least one transmit antenna used to send a signal and at least one receive antenna used to receive a signal. Therefore, communications devices in the communications system 100, such as the network device 110 and the terminal device 120, may communicate with each other by using a multi-antenna technology.

It should be understood that the network device in the communications system may be any device with a wireless sending/receiving function. The network device includes but is not limited to an evolved NodeB (eNB), a radio network controller (radio network controller, RNC), a NodeB (NB), a base station controller (base station controller, BSC), a base transceiver station (BTS), a home base station (for example, a home evolved NodeB or a home NodeB, HNB), a baseband unit (BBU), an access point (access point, AP) in a wireless fidelity (Wi-Fi) system, a wireless relay node, a wireless backhaul node, a transmission point (TP) or a transmission and reception point (TRP), and the like, or may be a gNB or a transmission point (TRP or TP) in a 5G system such as an NR system, one antenna panel or one group of antenna panels (including a plurality of antenna panels) of a base station in a 5G system, or may be a network node constituting a gNB or a transmission point, such as a baseband unit (BBU) or a distributed unit (DU).

In some deployment, the gNB may include a centralized unit (CU) and a DU. The gNB may further include an active antenna unit (AAU). The CU implements some functions of the gNB, and the DU implements some functions of the gNB. For example, the CU is responsible for processing a non-real-time protocol and a non-real-time service, to implement functions of a radio resource control (RRC) layer and a packet data convergence protocol (PDCP) layer. The DU is responsible for processing a physical layer protocol and a real-time service, to implement functions of a radio link control (RLC) layer, a media access control (MAC) layer, and a physical (PHY) layer. The AAU implements some processing functions of the physical layer, radio frequency processing, and a related function of an active antenna. Information at the RRC layer may finally become information at the PHY layer, or may be converted from information at the PHY layer. Therefore, in this architecture, it may be considered that higher layer signaling such as RRC layer signaling is sent by the DU or the DU and the AAU. It may be understood that the network device may be a device including one or more of a CU node, a DU node, and an AAU node. In addition, the CU may be classified into a network device in a radio access network (RAN), or the CU may be classified into a network device in a core network (CN). This is not limited in the embodiments of this application.

It should be further understood that the terminal device in the wireless communications system may also be referred to as user equipment (UE), an access terminal, a subscriber unit, a subscriber station, a mobile station, a remote station, a remote terminal, a mobile device, a user terminal, a terminal, a wireless communications device, a user agent, or a user apparatus. The terminal device in this embodiment of this application may be a mobile phone, a tablet computer (pad), a computer with a wireless sending/receiving function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, a mobile terminal equipped in a vehicle, or the like. An application scenario is not limited in this embodiment of this application.

It should be further understood that, FIG. 1 is merely an example of a simplified diagram for ease of understanding. The communications system 100 may further include another network device or another terminal device that is not drawn in FIG. 1.

To facilitate understanding of the embodiments of this application, the following briefly describes a process of processing a downlink signal at the physical layer before sending. It should be understood that the following described process of processing the downlink signal may be performed by a network device or a chip disposed in the network device. For ease of description, the network device and the chip disposed in the network device are collectively referred to as the network device below.

The network device may process a code word on a physical channel. The code word may be a coded bit obtained through coding (for example, including channel coding). The code word is scrambled (scrambling) to generate a scrambled bit. Modulation mapping is performed on the scrambled bit to obtain a modulated symbol. The modulated symbol is mapped to a plurality of layers, or referred to as transport layers, through layer mapping. The modulated symbol obtained through layer mapping is precoded to obtain a precoded signal. The precoded signal is mapped to a plurality of REs through resource element (RE) mapping. Subsequently, these REs are modulated through orthogonal frequency division multiplexing (OFDM) and then transmitted through an antenna port.

It should be understood that the foregoing described process of processing the downlink signal is merely an example for description, and should not constitute any limitation on the embodiments of this application. For a processing of the downlink signal, refer to the current technology. For brevity, detailed descriptions of the processing of the downlink signal are omitted herein.

To facilitate understanding of the embodiments of this application, the following first briefly describes the terms in the embodiments of this application.

1. Precoding technology: If a channel state is known, a sending device (for example, a network device) may process a to-be-sent signal by using a precoding matrix that matches the channel state, so that the to-be-sent signal obtained through precoding is adapted to a channel, thereby reducing complexity of eliminating inter-channel impact by a receiving device (for example, a terminal device). Therefore, the to-be-sent signal is precoded, so that received signal quality (for example, a signal to interference plus noise ratio (SINR)) is improved. Therefore, transmission between a sending device and a plurality of receiving devices may be implemented on a same time-frequency resource by using the precoding technology, or in other words, multi-user multiple-input multiple-output (MU-MIMO) is implemented.

It should be understood that the related descriptions of the precoding technology are merely an example for ease of understanding, and are not intended to limit the protection scope of the embodiments of this application. In an implementation, the sending device may perform precoding in another manner. For example, if channel information (for example, but not limited to, a channel matrix) cannot be learned, precoding is performed by using a preset precoding matrix or in a weighted processing manner. For brevity, specific content thereof is not described in this specification.

2. A channel state information (CSI) report may also be referred to as CSI for short. In a wireless communications system, a receive end (for example, a terminal device) reports, to a transmit end (for example, a network device), information that is used to describe a channel attribute of a communication link. The CSI report may include, for example, but is not limited to, a precoding matrix indicator (PMI), a rank indication (RI), a channel quality indicator (CQI), a channel state information-reference signal (CSI-RS), a CSI-RS resource indicator (CRI), and a layer indicator (LI). It should be understood that the foregoing listing of content of the CSI is merely an example for description, and should not constitute any limitation on the embodiments of this application. The CSI may include one or more of the foregoing listed items, or may include information used to represent the CSI other than the foregoing listed items. This is not limited in the embodiments of this application.

For example, the terminal device reports CSI to the network device.

The terminal device may report one or more CSI reports in a time unit (for example, a slot), and each CSI report may correspond to a configuration condition of CSI reporting. The configuration condition of the CSI reporting may be determined, for example, by using higher layer signaling (for example, an information element (IE) CSI reporting configuration (CSI-ReportingConfig) in a radio resource control (RRC) message). The CSI reporting configuration may be used to indicate a time domain behavior, bandwidth, a format corresponding to a report quantity, and the like that are of the CSI reporting. The time domain behavior includes, for example, periodic reporting, semi-persistent reporting, and aperiodic reporting. The terminal device may generate one CSI report based on one CSI reporting configuration.

In the embodiments of this application, when the terminal device generates a CSI report, content in the CSI report may be divided into two parts. For example, the CSI report may include a first part and a second part. The first part may also be referred to as a part 1. The second part may also be referred to as a part 2. The first part and the second part may be separately coded. A payload size of the first part may be predefined, and a payload size of the second part may be determined based on information carried in the first part.

The network device may decode the first part based on the predefined payload size of the first part to obtain the information carried in the first part. The network device may determine the payload size of the second part based on the information obtained from the first part, and then decode the second part to obtain information carried in the second part.

It should be understood that the first part and the second part are similar to a part 1 and a part 2 of CSI defined in the NR protocol TS38.214 release 15 (R15).

It should be further understood that, because the embodiments of this application mainly relate to reporting of a PMI, listing of content in the first part and the second part of the CSI report in the following embodiments relates to only information about the PMI, and does not relate to other information. However, it should be understood that this should not constitute any limitation on the embodiments of this application. In addition to listed information included or indicated in the first part and the second part of the CSI report in the following embodiments, the first part of the CSI report may include one or more of a CQI and an LI, or may include other information that may be used to predefine feedback overheads, and the second part of the CSI report may also include other information. This is not limited in the embodiments of this application.

It should be further understood that the first part and the second part are merely named for ease of differentiation, and should not constitute any limitation on the embodiments of this application. A possibility of defining other names for the first part and the second part in a future protocol is not precluded in the embodiments of this application.

3. A precoding matrix indicator (PMI) may be used to indicate a precoding matrix. The precoding matrix may be, for example, a precoding matrix determined by the terminal device based on a channel matrix of each frequency domain unit. The channel matrix may be determined by the terminal device through channel estimation or the like or based on channel reciprocity. However, it should be understood that a method for determining the precoding matrix by the terminal device is not limited to the foregoing descriptions. For a implementation, refer to the current technology. For brevity, no enumeration is provided herein.

For example, the precoding matrix may be obtained by performing singular value decomposition (SVD) on the channel matrix or a covariance matrix of the channel matrix, or may be obtained by performing eigenvalue decomposition (EVD) on the covariance matrix of the channel matrix. It should be understood that the foregoing listed manners of determining the precoding matrix are merely examples, and should not constitute any limitation on the embodiments of this application. For a manner of determining the precoding matrix, refer to the current technology. For brevity, no enumeration is provided herein.

It should be noted that, according to the method provided in the embodiments of this application, the network device may determine, based on feedback of the terminal device, a spatial domain vector, a frequency domain vector, and a weighting coefficient corresponding to the spatial domain vector and the frequency domain vector that are used to construct a precoding matrix, to further determine a precoding matrix corresponding to each frequency domain unit.

The precoding matrix may be directly used for downlink data transmission; or the precoding matrix finally used for downlink data transmission may be obtained by using some beamforming methods, including, for example, zero forcing (ZF), regularized zero-forcing (RZF), a minimum mean square error (MMSE), and a maximum signal-to-leakage-and-noise ratio (SLNR). This is not limited in the embodiments of this application. Unless otherwise specified, all the precoding matrices below may be precoding matrices determined based on the method provided in the embodiments of this application.

It may be understood that a precoding matrix determined by the terminal device may be a precoding matrix that is to be fed back. The terminal device may indicate, by using a PMI, the precoding matrix that is to be fed back, so that the network device restores the precoding matrix based on the PMI. The precoding matrix restored by the network device based on the PMI may be the same as or similar to the precoding matrix that is to be fed back.

In downlink channel measurement, if a degree of approximation between the precoding matrix determined by the network device based on the PMI and the precoding matrix determined by the terminal device is higher, a precoding matrix determined by the network device for data transmission can be more adapted to a channel state. Therefore, signal received quality can be improved.

4. A frequency domain unit is a unit of a frequency domain resource, and may represent different frequency domain resource granularities. The frequency domain unit may include, for example, but is not limited to, a channel quality indicator (CQI) subband, a 1/R of the CQI subband, a resource block (RB), a subcarrier, a resource block group (RBG), or a precoding resource block group (PRG). R is a positive integer. A value of R may be, for example, 1 or 2.

In the embodiments of this application, a PMI may be used to indicate a precoding matrix corresponding to a frequency domain unit, and the frequency domain unit may also be referred to as a PMI subband. R may represent a ratio of a granularity of the CQI subband to a granularity of the PMI subband. When R is 1, a granularity of one CQI subband is the same as a granularity of one PMI subband. When R is 2, a granularity of one CQI subband is twice a granularity of one PMI subband.

It should be noted that a precoding matrix corresponding to a frequency domain unit may be a precoding matrix determined by performing channel measurement and feedback based on a reference signal on the frequency domain unit. The precoding matrix corresponding to the frequency domain unit may be used to perform precoding on data subsequently transmitted by using the frequency domain unit. A precoding matrix or a precoding vector corresponding to a frequency domain unit may also be referred to as a precoding matrix or a precoding vector of the frequency domain unit below.

5. Precoding vector: One precoding matrix may include one or more vectors, such as column vectors. Each column vector may correspond to one transport layer. In other words, a precoding matrix corresponding to a frequency domain unit may be determined by using precoding vectors that are of the frequency domain unit and that are fed back based on one or more transport layers.

In dual-domain compression, mathematical transformation such as normalization processing may be performed on precoding vectors of a same frequency domain unit that are constructed by using spatial domain vectors, frequency domain vectors, and weighting coefficients fed back for different transport layers, to obtain a precoding matrix of the frequency domain unit. In other words, the precoding matrix may be determined by using precoding vectors corresponding to the same frequency domain unit that are on one or more transport layers. A mathematical transformation relationship between a precoding matrix and a precoding vector is not limited in the embodiments of this application.

Therefore, when there is one transport layer, a precoding vector may be a precoding matrix. When there is more than one transport layer, a precoding vector may be a component of a precoding matrix on one transport layer, or may be a vector obtained by performing mathematical transformation on a component of the precoding matrix on one transport layer. It should be understood that the performing mathematical transformation on a component of the precoding matrix on one transport layer to obtain the precoding vector is merely described for ease of describing a relationship between the precoding matrix and the precoding vector, and should not constitute any limitation on a process in which the network device and the terminal device determine a precoding matrix in the embodiments of this application.

6. A spatial domain vector is also referred to as a beam vector. Each element in the spatial domain vector may represent a weight of each antenna port. Based on the weight that is of each antenna port and that is represented by each element in the spatial domain vector, a signal of each antenna port is linearly superposed, and a region having a relatively strong signal may be formed in a direction of space.

An antenna port may also be referred to as a port. The antenna port may be understood as a transmit antenna that is identified by a receiving device, or a transmit antenna that can be differentiated in space. One antenna port may be preconfigured for each virtual antenna, each virtual antenna may be a weighted combination of a plurality of physical antennas, and each antenna port may correspond to one reference signal. Therefore, each antenna port may be referred to as a port of one reference signal, for example, a CSI-RS port or a sounding reference signal (SRS) port.

In the embodiments of this application, the reference signal may be a reference signal that is not precoded, and the reference signal port may be a transmit antenna port. The transmit antenna port may be an independent transceiver unit (TxRU).

For ease of description below, it is assumed that the spatial domain vector is denoted as u. A length of the spatial domain vector u may be a quantity $N_s$ of transmit antenna ports in one polarization direction, and $N_s \geq 1$ and $N_s$ is an integer. The spatial domain vector may be, for example, a column vector or a row vector whose length is $N_s$. This is not limited in the embodiments of this application.

Optionally, the spatial domain vector is taken from a discrete Fourier transform (DFT) matrix. Each column vector in the DFT matrix may be referred to as one DFT vector. In other words, the spatial domain vector may be a DFT vector. The spatial domain vector may be, for example, a two-dimensional (2D)-discrete Fourier transform (DFT) vector or an over-sampled 2D-DFT vector $v_{i,m}$ defined in a type II codebook in the NR protocol TS 38.214 release 15 (R15). For brevity, details are not described herein.

In the embodiments of this application, the spatial domain vector is one of vectors used to construct a precoding vector.

7. A spatial domain vector set may include a plurality of spatial domain vectors of different lengths, so as to correspond to different quantities of antenna ports. In the embodiments of this application, a spatial domain vector used to construct a precoding vector may be determined from the spatial domain vector set. In other words, the spatial domain vector set includes a plurality of candidate spatial domain vectors that may be used to construct the precoding vector.

In an embodiment, the spatial domain vector set may include $N_s$ spatial domain vectors, and every two of the $N_s$ spatial domain vectors may be orthogonal to each other. Each spatial domain vector in the spatial domain vector set may be taken from a 2D-DFT matrix. 2D may represent two different directions, for example, a horizontal direction and a vertical direction. If a quantity of antenna ports in the horizontal direction and a quantity of antenna ports in the vertical direction are $N_1$ and $N_2$ respectively, $N_s = N_1 N_2$.

For example, the $N_s$ spatial domain vectors may be denoted as $u_1, u_2, \ldots,$ and $u_{N_s}$. The $N_s$ spatial domain vectors may be used to construct a matrix $B_s$, and $B_s \square [u_1\ u_2\ \ldots\ u_{N_s}]$.

In an embodiment, the spatial domain vector set may be extended to $O_s \times N_s$ spatial domain vectors by using an over-sampling factor $O_s$. In this case, the spatial domain vector set may include $O_s$ subsets, and each subset may include $N_s$ spatial domain vectors. Every two of the $N_s$ spatial domain vectors in each subset may be orthogonal to each other. Each spatial domain vector in the spatial domain vector set may be taken from an over-sampled 2D-DFT matrix. The over-sampling factor $O_s$ is a positive integer. For example, $O_s = O_1 \times O_2$, where $O_1$ may be an over-sampling factor in the horizontal direction, and $O_2$ may be an over-sampling factor in the vertical direction. $O_1 \geq 1$, $O_2 \geq 1$, and $O_1$ and $O_2$ are not 1 at the same time and are both integers.

$N_s$ spatial domain vectors in an $o_s^{th}$ ($1 \leq o_s \leq O_s$ and $o_s$ is an integer) subset in the spatial domain vector set may be separately denoted as $u_1^{o_s}, u_2^{o_s}, \ldots,$ and $u_{N_s}^{o_s}$. A matrix $B_s^{o_s}$ may be constructed based on the $N_s$ spatial domain vectors in the $o_s^{th}$ subset, and $B_s^{o_s} \square [u_1^{o_s}\ u_2^{o_s}\ \ldots\ u_{N_s}^{o_s}]$.

Therefore, each spatial domain vector in the spatial domain vector set may be taken from the 2D-DFT matrix or the over-sampled 2D-DFT matrix. Each column vector in the spatial domain vector set may be referred to as a 2D-DFT vector or an over-sampled 2D-DFT vector. In other words, the spatial domain vector may be a 2D-DFT vector or an over-sampled 2D-DFT vector.

8. A frequency domain vector is a vector that may be used to represent variation of a channel in frequency domain. Each frequency domain vector may represent variation. When a signal is transmitted on a radio channel, the signal may be transmitted from a transmit antenna to a receive antenna through a plurality of paths. A multipath delay causes frequency selective fading, which is a change of a frequency domain channel. Therefore, variation of a channel in frequency domain caused by delays on different transmission paths may be represented by using different frequency domain vectors.

In the embodiments of this application, the frequency domain vector may be used with the foregoing spatial domain vector to construct a combination of the spatial domain vector and the frequency domain vector, or referred to as a space-frequency vector pair, to construct a precoding vector.

For ease of description below, it is assumed that the frequency domain vector is denoted as v. A length of the frequency domain vector may be denoted as $N_3$, and $N_3 \geq 1$ and $N_3$ is an integer.

9. A frequency domain vector set may include a plurality of frequency domain vectors of different lengths. In the embodiments of this application, a frequency domain vector used to construct a precoding vector may be determined from the frequency domain vector set. In other words, the frequency domain vector set includes a plurality of candidate frequency domain vectors that may be used to construct the precoding vector.

In an embodiment, the frequency domain vector set may include $N_3$ frequency domain vectors. Every two of the $N_3$ frequency domain vectors may be orthogonal to each other. Each frequency domain vector in the frequency domain vector set may be taken from a DFT matrix or an inverse discrete Fourier transform (IDFT) matrix.

For example, the $N_3$ frequency domain vectors may be denoted as $v_1, v_2, \ldots$ and $v_{N_3}$. The $N_3$ frequency domain vectors may be used to construct a matrix $B_f$, and $B_f \square [v_1\ v_2\ \ldots\ v_{N_3}]$.

In an embodiment, the frequency domain vector set may be extended to $O_f \times N_f$ frequency domain vectors by using an oversampling factor $O_f$. In this case, the frequency domain vector set may include Or subsets, and each subset may include $N_f$ frequency domain vectors. Every two of the $N_f$ frequency domain vectors in each subset may be orthogonal to each other. Each subset may be referred to as an orthogonal group. Each frequency domain vector in the frequency domain vector set may be taken from an oversampled DFT matrix. The over-sampling factor $O_f$ is a positive integer.

For example, $N_f$ frequency domain vectors in an $o_f^{th}$ ($1 \leq o_f \leq O_f$ and $o_f$ is an integer) subset in the frequency domain vector set may be separately denoted as $v_1^{o_f}, v_2^{o_f}, \ldots,$ and $v_{N_f}^{o_f}$. A matrix $B_f^{o_f}$ may be constructed based on the $N_f$ frequency domain vectors in the $o_f^{th}$ subset, and $B_f^{o_f} \square [v_1^{o_f}\ v_2^{o_f}\ \ldots\ v_{N_f}^{o_f}]$.

Therefore, each frequency domain vector in the frequency domain vector set may be taken from a DFT matrix or an over-sampled DFT matrix, or may be taken from an IDFT matrix or an over-sampled IDFT matrix. Correspondingly, each column vector in the frequency domain vector set may be referred to as a DFT vector or an over-sampled DFT vector, or may be referred to as an IDFT vector or an over-sampled IDFT vector. In other words, the frequency domain vector may be a DFT vector or an over-sampled DFT vector, or may be an IDFT vector or an over-sampled IDFT vector.

10. Space-frequency component matrix: One space-frequency component matrix may be determined by using one spatial domain vector and one frequency domain vector. For example, one space-frequency component matrix may be determined through conjugate transpose of one spatial domain vector and one frequency domain vector, for example, $u \times v^H$, and a dimension thereof may be $N_s \times N_3$.

It should be understood that the space-frequency component matrix may be a representation form of a space-frequency basic unit determined by using one spatial domain vector and one frequency domain vector. The space-frequency basic unit may be alternatively represented as, for example, a space-frequency component vector, and the space-frequency component vector may be determined, for example, by using a Kronecker product of one spatial domain vector and one frequency domain vector. The space-frequency basic unit may be alternatively represented as, for example, a space-frequency vector pair. A representation form of the space-frequency basic unit is not limited in the embodiments of this application. Various forms determined by a person skilled in the art by using one spatial domain vector and one frequency domain vector based on a same conception fall within the protection scope of this application. In addition, if a form different from that listed above is defined for a spatial domain vector or a frequency domain vector, an operation relationship between the space-frequency component matrix, and the spatial domain vector and the frequency domain vector may also be different. The operation relationship between the space-frequency component matrix, and the spatial domain vector and the frequency domain vector is not limited in the embodiments of this application.

11. A space-frequency matrix may be understood as an intermediate quantity used to determine a precoding matrix corresponding to each frequency domain unit. For the terminal device, the space-frequency matrix may be determined by using a precoding matrix or a channel matrix corresponding to each frequency domain unit. For the network device, the space-frequency matrix may be obtained by using a weighted sum of a plurality of space-frequency component matrices, to restore a downlink channel or a precoding matrix.

For example, the space-frequency matrix may be denoted as H, and $H=[w_1 \ w_2 \ \ldots \ w_{N_3}]$. $w_1$ to $w_{N_3}$ are $N_3$ column vectors corresponding to $N_3$ frequency domain units, each column vector may be a precoding matrix corresponding to each frequency domain unit, and a length of each column vector may be $N_s$. The $N_3$ column vectors respectively correspond to precoding vectors of the $N_3$ frequency domain units. In other words, the space-frequency matrix may be considered as a joint matrix formed by a combination of the precoding vectors corresponding to the $N_3$ frequency domain units.

In addition, the space-frequency matrix may correspond to a transport layer. A precoding vector of each frequency domain unit on a same transport layer may be used to construct a space-frequency matrix corresponding to the transport layer. For example, a precoding vector of each frequency domain unit on a $z^{th}$ transport layer may be used to construct a space-frequency matrix corresponding to the $z^{th}$ transport layer. For ease of description below, a space-frequency matrix corresponding to a transport layer is referred to as a space-frequency matrix of the transport layer.

It should be understood that the space-frequency matrix is merely a representation form of the intermediate quantity used to determine the precoding matrix, and should not constitute any limitation on the embodiments of this application. For example, column vectors in the space-frequency matrix are successively head-to-tail connected in a left-to-right sequence, or are arranged according to another predefined rule, to obtain a vector whose length is $N_s \times N_3$. The vector may be referred to as a space-frequency vector.

It should be further understood that dimensions of the space-frequency matrix and the space-frequency vector shown above are merely examples, and should not constitute any limitation on the embodiments of this application. For example, the space-frequency matrix may be alternatively a matrix whose dimension is $N_3 \times N_s$. Each row vector may correspond to one frequency domain unit, to determine a precoding vector of the corresponding frequency domain unit.

In addition, when a plurality of polarization directions are configured for a transmit antenna, the dimension of the space-frequency matrix may be further extended. For example, for a dual-polarized antenna, the dimension of the space-frequency matrix may be $2N_s \times N_3$ or $N_3 \times 2N_s$. It should be understood that a quantity of polarization directions of the transmit antenna is not limited in the embodiments of this application.

12. Dual-domain compression may include two dimensions of compression: spatial domain compression and frequency domain compression. The spatial domain compression may mean that one or more spatial domain vectors are selected from a spatial domain vector set as vectors for constructing a precoding vector. The frequency domain compression may mean that one or more frequency domain vectors are selected from a frequency domain vector set as vectors for constructing a precoding vector. As described above, a matrix constructed by using one spatial domain vector and one frequency domain vector may be referred to as a space-frequency component matrix. One or more selected spatial domain vectors and one or more selected frequency domain vectors may be used to construct one or more space-frequency component matrices. A weighted sum of the one or more space-frequency component matrices may be used to construct a space-frequency matrix corresponding to one transport layer. In other words, the space-frequency matrix may be approximately the weighted sum of the space-frequency component matrices constructed by using the selected one or more spatial domain vectors and the selected one or more frequency domain vectors. Based on a space-frequency matrix corresponding to one transport layer, a precoding vector corresponding to each frequency domain unit on the transport layer may be further determined.

The selected one or more spatial domain vectors may be used to construct a matrix $W_1$, and each column vector in $W_1$ corresponds to one selected spatial domain vector. The selected one or more frequency domain vectors may be used to construct a matrix $W_3$, and each column vector in $W_3$ corresponds to one selected frequency domain vector. A space-frequency matrix H may be represented as a result $H=W_1CW_3^H$ of linear combination of the selected one or more spatial domain vectors and the selected one or more frequency domain vectors.

Taking a $z^{th}$ ($1 \le Z \le Z$ and z is an integer) transport layer as an example, it is assumed that a space-frequency matrix of the $z^{th}$ transport layer is $H=W_1CW_3^H$.

If a dual-polarized antenna is used, $L^z$ spatial domain vectors may be selected for each polarization direction, and a dimension of $W_1$ may be $2N_s \times 2L^z$. In an embodiment, same $L^z$ spatial domain vectors $\{b_s^1, b_s^2, \ldots, b_s^{L^z}\}$ may be used in two polarization directions. For example, $b_s^1$, $b_2^1, \ldots, b_s^{L^z}$ may be L spatial domain vectors selected from the foregoing spatial domain vector set. In this case, $W_1$ may be represented as $$\begin{bmatrix} b_s^1 & b_s^2 & \ldots & b_s^{L^z} & 0 & 0 & 0 & 0 \\ 0 & 0 & 0 & 0 & b_s^1 & b_s^2 & \ldots & b_s^{L^z} \end{bmatrix},$$

where $b_s^l$ represents an $l^{th}$ spatial domain vector in the selected $L^z$ spatial domain vector, and $l=1, 2, \ldots,$ or $L^z$.

If $M^z$ frequency domain vectors are selected, a dimension of $W_3^H$ may be $M^z \times N_3$. Each column vector in $W_3$ may be one frequency domain vector. In this case, each spatial domain vector in $W_1$ and each frequency domain vector in $W_3$ may form one space-frequency vector pair, each space-frequency vector pair may correspond to one weighting coefficient. Therefore, $2L^z \times M^z$ space-frequency vector pairs formed by $2L^z$ spatial domain vectors and $M^z$ frequency domain vectors may be in a one-to-one correspondence with $2L^z \times M^z$ weighting coefficients.

C is a coefficient matrix constructed by using the $2L^z \times M^z$ weighting coefficients, and a dimension thereof may be $2L \times M^z$. An $l^{th}$ row in the coefficient matrix C may correspond to an $l^{th}$ spatial domain vector in a first polarization direction in the $2L^z$ spatial domain vectors, and an $(L^z+l)^{th}$ row in the coefficient matrix C may correspond to an $l^{th}$ spatial domain vector in a second polarization direction in the $2L^z$ spatial domain vectors. An $m^{th}$ column in the coefficient matrix C may correspond to an $m^{th}$ frequency domain vector in the $M^z$ frequency domain vectors.

Optionally, the Z transport layers may separately use respective independent spatial domain vectors. Spatial domain vectors reported by the terminal device for the Z transport layers may include a sum of spatial domain vectors reported for each transport layer. In this case, assuming that a quantity of spatial domain vectors reported by the terminal device for the Z transport layers is L, $$L = \sum_{z=1}^{Z} L^z.$$

Optionally, the Z transport layers may separately use respective independent frequency domain vectors. Frequency domain vectors reported by the terminal device for the Z transport layers may include a sum of frequency domain vectors reported for each transport layer. In this case, assuming that a quantity of frequency domain vectors reported by the terminal device for the Z transport layers is M, $$M = \sum_{z=1}^{Z} M^z.$$

Optionally, the Z transport layers may share L spatial domain vectors. The L spatial domain vectors reported by the terminal device may be used to construct a precoding vector of each frequency domain unit on any one of the Z transport layers. In this case, the foregoing quantity of spatial domain vectors reported by the terminal device for the $z^{th}$ transport layer is $L^z = L$.

Optionally, the Z transport layers may share M frequency domain vectors. The M frequency domain vectors reported by the terminal device may be used to construct a precoding vector of each frequency domain unit on any one of the Z transport layers. In this case, the foregoing quantity of frequency domain vectors reported by the terminal device for the $z^{th}$ transport layer is $M^z = M$.

Optionally, the Z transport layers may be alternatively classified into a plurality of transport layer groups. One or more transport layers in a same transport layer group may share a spatial domain vector and/or a frequency domain vector. Transport layers in different transport layer groups may separately use respective independent spatial domain vectors and/or frequency domain vectors.

It should be understood that a relationship between the space-frequency matrix H, and $W_1$ and $W_3$ shown above is merely an example, and should not constitute any limitation on the embodiments of this application. Based on a same conception, a person skilled in the art may perform mathematical transformation on the foregoing relationship to obtain another calculation formula used to represent the relationship between the space-frequency matrix H, and $W_1$ and $W_3$. For example, the space-frequency matrix H may be alternatively represented as $H = W_1 C W_3$. In this case, each row vector in $W_3$ corresponds to one selected frequency domain vector.

Because spatial domain compression and frequency domain compression are separately performed in the dual-domain compression, the terminal device may feed back one or more selected spatial domain vectors and one or more selected frequency domain vectors to the network device, and does not need to feed back a weighting coefficient (for example, including an amplitude and a phase) of a subband based on each frequency domain unit (for example, a subband). Therefore, feedback overheads can be greatly reduced. In addition, because a frequency domain vector can represent variation of a channel in frequency domain, a change of the channel in frequency domain is simulated through linear superposition of one or more frequency domain vectors. Therefore, relatively high feedback precision can still be maintained, so that a precoding matrix restored by the network device based on feedback of the terminal device can still be better adapted to the channel.

It should be understood that, to facilitate understanding of the dual-domain compression, terms such as the space-frequency component matrix, the space-frequency matrix, and the space-frequency vector pair are separately defined above, but this should not constitute any limitation on the embodiments of this application. A process of determining a PMI by the terminal device is an internal implementation behavior of the terminal device. The process of determining the PMI by the terminal device is not limited in the embodiments of this application. A process of determining a precoding matrix by the network device based on the PMI is an internal implementation behavior of the network device. The process of determining the precoding matrix by the network device based on the PMI is not limited in the embodiments of this application. The terminal device and the network device may separately generate the PMI and restore the precoding matrix by using different algorithms.

13. Weighting coefficient: In dual-domain compression, a weighting coefficient may also be referred to as a space-frequency combination coefficient, a combination coefficient, or the like. Each weighting coefficient may correspond to one spatial domain vector and one frequency domain vector that are selected for constructing a precoding vector, or may correspond to one space-frequency component matrix, or may correspond to one space-frequency vector pair. The weighting coefficient may be used to represent a weight of a space-frequency component matrix constructed by using one spatial domain vector and one frequency domain vector that are used to construct a precoding vector.

Each weighting coefficient may include an amplitude and a phase. For example, in a weighting coefficient $ae^{j\theta}$, a is an amplitude and $\theta$ is a phase.

In a plurality of space-frequency vector pairs that are selected by the terminal device to construct a precoding matrix, each space-frequency vector pair may correspond to one weighting coefficient. In a plurality of weighting coefficients corresponding to the plurality of space-frequency vector pairs, amplitudes (or amplitude values) of some weighting coefficients may be zero or close to zero, and quantized values corresponding to the amplitudes of the weighting coefficients may be zero. A weighting coefficient whose amplitude is quantized by using a quantized value zero may be referred to as a weighting coefficient whose amplitude is zero. Correspondingly, amplitudes of some weighting coefficients are relatively large, and quantized values corresponding to the amplitudes of the weighting coefficients are not zero. A weighting coefficient whose amplitude is quantized by using a non-zero quantized value may be referred to as a weighting coefficient whose amplitude is not zero. In other words, the plurality of weighting coefficients corresponding to the plurality of space-frequency vector pairs may include one or more weighting coefficients whose amplitudes are not zero and one or more weighting coefficients whose amplitudes are zero.

It should be understood that a weighting coefficient may be indicated by using a quantized value, an index of a quantized value, or a non-quantized value. An indication manner of the weighting coefficient is not limited in the embodiments of this application, provided that a peer end knows the weighting coefficient. In the embodiments of this application, for ease of description, information used to indicate the weighting coefficient is referred to as quantization information of the weighting coefficient. The quantization information may be, for example, a quantized value, an index, or any other information that may be used to indicate the weighting coefficient.

14. A transport layer may also be referred to as a spatial layer, a layer, a transport stream, a spatial stream, a stream, or the like. The network device may determine, based on a rank that is of a channel matrix and that is fed back by UE, a quantity of transport layers used for data transmission between the network device and the terminal device. The terminal device may determine the rank of the channel matrix based on a channel obtained through channel estimation. For example, a precoding matrix may be determined by performing singular value decomposition (SVD) on a channel matrix or a covariance matrix of the channel matrix. In an SVD process, different transport layers may be distinguished based on eigenvalues. For example, a precoding vector determined based on an eigenvector corresponding to a largest eigenvalue may correspond to the first transport layer, and a precoding vector determined based on an eigenvector corresponding to a smallest eigenvalue may correspond to a $Z^{th}$ transport layer. In other words, eigenvalues corresponding to the first transport layer to the $Z^{th}$ transport layer successively decrease.

It should be understood that distinguishing of different transport layers based on eigenvalues is merely one embodiment, and should not constitute any limitation on the embodiments of this application. For example, another criterion for distinguishing transport layers may be predefined in a protocol. This is not limited in the embodiments of this application.

To control reporting overheads, in a currently known implementation, the terminal device may report only a subset of a plurality of weighting coefficients included in the foregoing coefficient matrix C. It is assumed that a maximum quantity that is of spatial domain vectors and that is configured by the network device for the terminal device is L, and the L spatial domain vectors may be shared by a plurality of transport layers. A maximum quantity that is of frequency domain vectors reported for the $z^{th}$ transport layer and that is configured by the network device for the terminal device is $M^z$, and a maximum quantity that is of weighting coefficients reported for the $z^{th}$ transport layer and that is configured by the network device for the terminal device is $K^z$. There may be a proportional relationship between $K^z$ and a total quantity $2L \times M^z$ of weighting coefficients included in the coefficient matrix C. For example, $K^z = \lceil \beta \times 2LM^z \rceil$, where $\beta$ is a preconfigured value. A quantity of weighting coefficients that may be reported by the terminal device may be less than or equal to $K^z$.

To improve spectrum resource utilization and improve a data transmission capability of a communications system, the network device may transmit data to the terminal device on a plurality of transport layers. However, when a quantity of transport layers increases, feedback overheads also increase. For example, if the terminal device feeds back a spatial domain vector and a frequency domain vector based on each transport layer, a quantity of spatial domain vectors, a quantity of frequency domain vectors, and a quantity of weighting coefficients that need to be fed back may increase as a quantity of transport layers increases. Based on this, the embodiments of this application provide a vector indicating method for constructing a precoding vector, to reduce feedback overheads.

To facilitate understanding of the embodiments of this application, the following descriptions are first provided before the embodiments of this application are described.

1. For ease of understanding and description, the following descriptions and assumptions are first provided for main parameters in the embodiments of this application:

L is a quantity that is of reported spatial domain vectors and that is preconfigured by a network device for a terminal device, or a maximum quantity of spatial domain vectors reported by the terminal device. A quantity of spatial domain vectors actually reported by the terminal device may be less than or equal to L. For ease of description below, it is assumed that the quantity of spatial domain vectors actually reported by the terminal device is L. In the embodiments of this application, the L spatial domain vectors may be spatial domain vectors shard by Z transport layers, and may be used to construct a precoding vector of each frequency domain unit on any one of the Z transport layers. It should be noted that the L spatial domain vectors may be different from each other.

Depending on the latest development of the 3rd generation partnership project (3GPP), a value of L may be 2, 4, or 6.

$M^z$ is a quantity that is of frequency domain vectors reported for a $z^{th}$ transport layer and that is preconfigured by the network device for the terminal device, or a maximum quantity of frequency domain vectors reported by the terminal device for the $z^{th}$ transport layer. A quantity of frequency domain vectors actually reported by the terminal device for the $z^{th}$ transport layer may be less than or equal to $M^z$. For ease of description below, it is assumed that the quantity of frequency domain vectors actually reported by the terminal device for the $z^{th}$ transport layer is $M^z$. In the embodiments of this application, the $M^z$ frequency domain vectors are frequency domain vectors corresponding to the $z^{th}$ transport layer, and may be used with the foregoing L spatial domain vectors and the following $K^z$ weighting coefficients to jointly construct a precoding vector of each frequency domain unit on the $z^{th}$ transport layer.

Z is a rank of a channel matrix. That is, Z is a maximum quantity of transport layers that can be used when the network device communicates with one terminal device. The maximum quantity of transport layers that can be used when the network device communicates with the terminal device may be determined based on a quantity of transmit antenna ports configured by the network device and a quantity of receive antennas configured by the terminal device. For example, Z may be less than or equal to a smaller one in the quantity of transmit antenna ports configured by the network device and the quantity of receive antennas configured by the terminal device. In the embodiments of this application, $Z \geq 2$, and Z is a positive integer. For example, Z is 2, 3, or 4. It should be understood that a specific value of the quantity of transport layers listed herein should not constitute any limitation on the embodiments of this application. A value of the quantity Z of transport layers is not limited in the embodiments of this application.

z corresponds to Z, z may be a value in a range of 1 to Z, and z is a positive integer.

$K^z$ is a quantity that is of weighting coefficients reported for the $z^{th}$ transport layer and that is preconfigured by the network device for the terminal device, or a maximum quantity of weighting coefficients reported by the terminal device for the $z^{th}$ transport layer. A quantity of weighting coefficients actually reported by the terminal device for the $z^{th}$ transport layer may be less than or equal to $K^z$. For ease of description below, it is assumed that the quantity of weighting coefficients actually reported by the terminal device for the $z^{th}$ transport layer is $K^z$. In the embodiments of this application, the $K^z$ weighting coefficients are weighting coefficients corresponding to the $z^{th}$ transport layer, and may be used with the foregoing L spatial domain vectors and the foregoing $M^z$ frequency domain vectors to jointly construct a precoding vector of each frequency domain unit on the $z^{th}$ transport layer.

$K_0$ is a maximum quantity of weighting coefficients reported by the terminal device for one transport layer, or a quantity that is of weighting coefficients reported for the transport layer and that is preconfigured by the network device for the terminal device, or a quantity that is of reported weighting coefficients and that is preconfigured by the network device for the transport layer when the rank Z is 1. It may be understood that $K_0$ is a value $K^1$ when z in the foregoing defined $K^z$ is 1. In the embodiments of this application, $K^1$ is solely defined as $K_0$ merely for ease of description and the two have a same meaning.

2. In the embodiments, for ease of description, when it comes to numbering, consecutive numbering may be started from 1. For example, the Z transport layers may include the first transport layer to a $Z^{th}$ transport layer. By analogy, examples are not described one by one herein. Certainly, this is not limited thereto during an implementation. For example, consecutive numbering may be alternatively started from 0. It should be understood that the foregoing descriptions are set for ease of describing the technical solutions provided in the embodiments of this application, but are not intended to limit the scope of this application.

3. In the embodiments of this application, a plurality of parameters are provided with a superscript and a subscript. For ease of differentiation, the superscript is represented as corresponding to a specific transport layer, and the subscript is represented as corresponding to a specific type of transport layer.

For example, $M^1$ represents a maximum quantity of frequency domain vectors reported for the first transport layer, and $M_1$ represents a maximum quantity of frequency domain vectors reported for a first-type transport layer.

For another example, $p^1$ represents a coefficient configured for the first transport layer, and $p_1$ represents a coefficient configured for the first-type transport layer. It should be noted that, for a transport layer, the coefficient may be a uniquely determined value, that is, $p^1$ may be configured as one determined value. One type of transport layer may include one or more transport layers, and the coefficient may have a plurality of values, that is, $p_1$ may be configured as one or more values. For a coefficient p, regardless of whether the superscript is used to distinguish a specific transport layer or the subscript is used to distinguish a first-type transport layer from a second-type transport layer, the superscript and the subscript are essentially used to represent the coefficient p. $p_1$, $p_2$, $p^1$, and $p^2$ are alternately used when the coefficient p is described below, and are essentially representation forms of the coefficient p when the coefficient p is used for different transport layers or different types of transport layers, and a person skilled in the art may understand the meaning thereof.

In addition, $p_{0,1}$, $p_{0,2}$, and $p_{0,3}$ in this specification may represent optional values of the coefficient p.

For brevity, descriptions of a same or similar case are omitted below.

4. In the embodiments of this application, "being used to indicate" may include being used to directly indicate and being used to indirectly indicate. For example, when a specific piece of indication information is described as being used to indicate information I, the indication information may be used to directly indicate I or indirectly indicate I, but it does not mean that the indication information definitely carries I.

Information indicated by indication information is referred to as to-be-indicated information. In an implementation, the to-be-indicated information is indicated in many manners. For example, the to-be-indicated information may be directly indicated, for example, the to-be-indicated information itself or an index of the to-be-indicated information; or the to-be-indicated information may be indirectly indicated by indicating other information, where there is an association relationship between the other information and the to-be-indicated information; or only a part of the to-be-indicated information may be indicated, and the remaining of the to-be-indicated information is known or agreed upon in advance. For example, specific information may be alternatively indicated in an arrangement order of each piece of information that is agreed upon in advance (for example, stipulated in a protocol), to reduce indication overheads to some extent. In addition, a common part of each piece of information may be alternatively identified and indicated uniformly, to reduce indication overheads caused by separately indicating same information. For example, a person skilled in the art should understand that a precoding matrix includes precoding vectors, and the precoding vectors in the precoding matrix may have a same part in terms of components or other attributes.

In addition, a specific indication manner may be alternatively various existing indication manners, for example, but not limited to, the foregoing indication manners and various combinations thereof. For details of the various indication manners, refer to the current technology. Details are not described herein. It may be learned from the foregoing descriptions that, for example, when a plurality of pieces of information of a same type need to be indicated, different information may be indicated in different manners. In an implementation, a required indication manner may be selected based on a requirement. The selected indication manner is not limited in the embodiments of this application. In this way, the indication manners in the embodiments of this application should be understood as covering various methods for learning of to-be-indicated information by a to-be-indicated party.

In addition, the to-be-indicated information may have other equivalent forms. For example, a row vector may be represented as a column vector, and a matrix may be represented by a transposed matrix of the matrix, or a matrix may be represented in a form of a vector or an array. The vector or the array may be formed by connecting row vectors or column vectors of the matrix, and a Kronecker product of two vectors may be represented by a product of one vector and a transposed vector of the other vector. The technical solutions provided in the embodiments of this application should be understood as covering various forms. For example, some or all features in the embodiments of this application should be understood as covering various representation forms of the features.

The to-be-indicated information may be sent as a whole, or may be divided into a plurality of pieces of sub-information for separate sending, and sending periods and/or sending occasions of these pieces of sub-information may be the same or different. A sending method is not limited in the embodiments of this application. The sending periods and/or the sending occasions of these pieces of sub-information may be predefined, for example, predefined according to a protocol, or may be configured by a transmit end device by sending configuration information to a receive end device. The configuration information may include, for example, but is not limited to, one or a combination of at least two of radio resource control signaling such as RRC signaling, MAC layer signaling such as MAC-CE signaling, and physical layer signaling such as downlink control information (DCI).

5. In the embodiments shown below, the first, the second, and various numeric numbers are merely distinguished for ease of description, and are not intended to limit the scope of the embodiments of this application. For example, different indication information and different types of transport layers are distinguished.

6. "Predefined" or "preconfigured" may be implemented by prestoring corresponding code or a corresponding table on devices (for example, including the terminal device and the network device) or in another manner that may be used to indicate related information, and an implementation thereof is not limited in the embodiments of this application. "Store" may mean being stored in one or more memories. The one or more memories may be separately disposed, or may be integrated into an encoder, a decoder, a processor, or a communications apparatus. Alternatively, some of the one or more memories are separately disposed, and some of the one or more memories are integrated into a decoder, a processor, or a communications apparatus. A type of the memory may be any form of storage medium. This is not limited in the embodiments of this application.

7. "Protocol" in the embodiments of this application may be a standard protocol in the communications field, for example, may include an LTE protocol, an NR protocol, and a related protocol applied to a future communications system. This is not limited in the embodiments of this application.

8. "At least one" means one or more, and "a plurality of" means two or more. The term "and/or" describes an association relationship for describing associated objects and represents that three relationships may exist. For example, A and/or B may represent the following three cases: Only A exists, both A and B exist, and only B exists, where A and B may be singular or plural. The character "/" generally indicates an "or" relationship between the associated objects. "At least one of the following items" or similar expression means any combination of these items, including a single item or any combination of a plurality of items. For example, at least one of a, b, and c may represent a, b, c, a and b, a and c, b and c, or a, b and c, where there may be one or more of a, b, and c.

The following describes in detail a precoding matrix indicating and determining method provided in the embodiments of this application with reference to the accompanying drawings.

The method provided in the embodiments of this application may be applied to a system in which communication is performed by using a multi-antenna technology, for example, the communications system 100 shown in FIG. 1. The communications system may include at least one network device and at least one terminal device. The network device and the terminal device may communicate with each other by using the multi-antenna technology.

It should be understood that the method provided in the embodiments of this application is not limited to communication between the network device and the terminal device, but may also be applied to communication between terminal devices, and the like. A scenario to which the method is applied is not limited in the embodiments of this application. The embodiments shown below are merely for ease of understanding and description. Interaction between the network device and the terminal device is used as an example to describe in detail the method provided in the embodiments of this application.

It should be further understood that the embodiments shown below do not particularly limit a structure of an execution body of the method provided in the embodiments of this application, provided that a program recording code of the method provided in the embodiments of this application can be run to implement communication according to the method provided in the embodiments of this application. For example, the execution body of the method provided in the embodiments of this application may be the terminal device or the network device, or may be a function module capable of invoking and executing a program in the terminal device or the network device.

Figure 2:
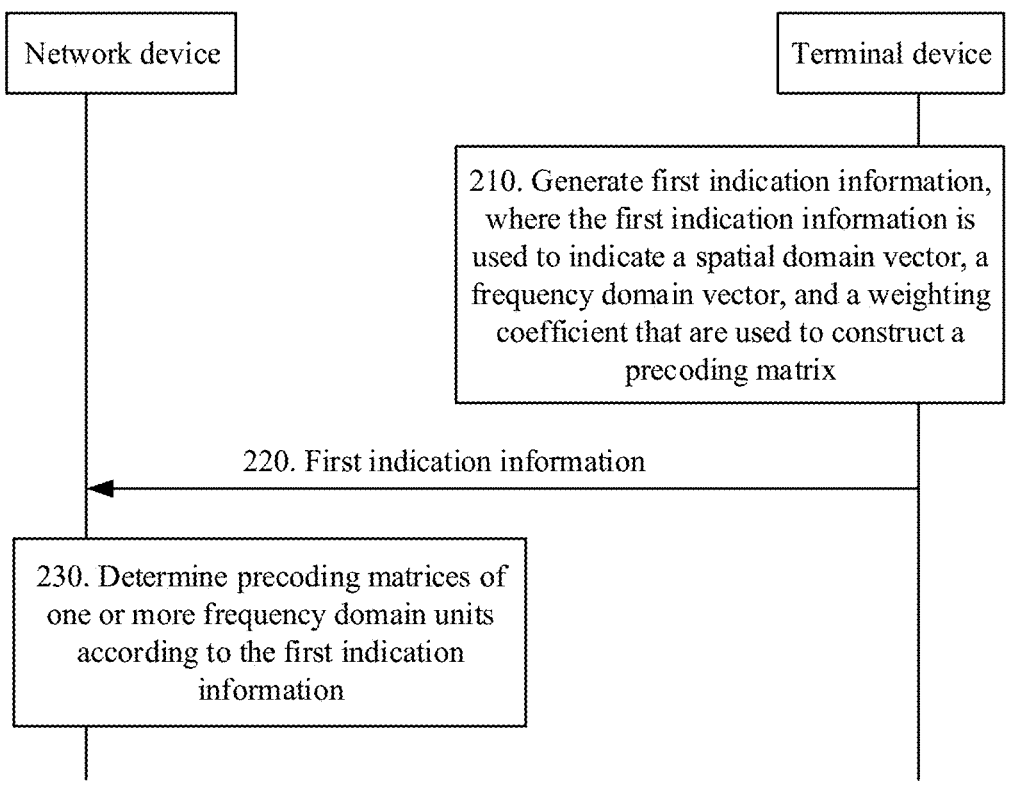
FIG. 2 is a flowchart of a method according to an embodiment of this application.

FIG. 2 is a flowchart of a precoding matrix indicating and determining method 200 according to an embodiment of this application from a perspective of interaction between devices. As shown in FIG. 2, the method 200 may include operation 210 to operation 230. The following describes the operations in the method 200 in detail.

In operation 210, a terminal device generates first indication information, where the first indication information is used to indicate a spatial domain vector, a frequency domain vector, and a weighting coefficient that are used to construct a precoding matrix.

The first indication information may be determined by the terminal device based on a channel measurement result. The first indication information may be used to indicate the spatial domain vector, the frequency domain vector, and the weighting coefficient, to indicate to construct a precoding matrix corresponding to each frequency domain unit. A maximum quantity of spatial domain vectors, a maximum quantity of frequency domain vectors, and a maximum quantity of weighting coefficients that are fed back by the terminal device may be determined based on a parameter preconfigured by a network device.

In an embodiment, the network device may preconfigure a quantity L of reported spatial domain vectors for the terminal device by using signaling. In other words, the maximum quantity of spatial domain vectors reported by the terminal device is L. It is assumed that a quantity of spatial domain vectors reported by the terminal device for each transport layer is L. If a rank of a channel is Z, Z transport layers may share same L spatial domain vectors, and the L spatial domain vectors are different from each other. When indicating the L spatial domain vectors by using the first indication information, the terminal device may indicate the L spatial domain vectors only once, and does not need to indicate the L spatial domain vectors for each transport layer.

The network device may further preconfigure a coefficient p for the terminal device by using signaling, where $0<p\leq1$. Based on different values of the rank Z, the coefficient p may have different values. In addition, values that are of the coefficient p and that correspond to the Z transport layers may be the same or different. When a value of the rank Z is greater than 1, values of the coefficient p may be one of a plurality of groups of predefined values. For example, the values of the coefficient p may include $\{½, ¼\}$, $\{¼, ⅛\}$, $\{⅔, ⅓\}$, $\{⅜, ¼\}$, or $\{½, ⅜\}$. A plurality of values in each group of values may be bound. In a protocol, it may be predefined that the network device may indicate a larger value in one group of values when indicating a value of the coefficient p. For example, the network device may indicate ½, and the terminal device may determine that two values of the coefficient p are $\{½, ¼\}$. A plurality of values in a same group of values may be used together to determine a maximum quantity of frequency domain vectors reported by the terminal device for each transport layer when the rank is any value in a range greater than 1, for example, when the rank is 2, 3, or 4. For details, refer to examples in Table 1 and Table 2 below. For example, if a coefficient configured for a $z^{th}$ ($1 \leq z \leq Z$ and z is an integer) layer is $p^z$, a maximum quantity of frequency domain vectors reported for the $z^{th}$ transport layer may be $M^z$ and $M^z$ may be determined through calculation by using $p^z$ based on a predefined formula.

In addition, when configuring a value of the coefficient p for the terminal device, the network device may indicate, to the terminal device by using a correspondence between different values of p and indexes, an index corresponding to a selected value. In an implementation, the value of p may be bound to another parameter, for example, L and/or β. Each group of bound values may correspond to one index. The network device may simultaneously indicate, in an index indication manner, parameters (for example, L and p, β and p, or L, p and β) configured for the terminal device. For example, in examples in Table 3 to Table 10 below, a combination of different values of L, p, and β may correspond to one index.

Depending on the latest development of 3GPP, currently, it has been determined that when the rank is 1, a maximum quantity $M^1$ of frequency domain vectors reported by the terminal device satisfies:

$$M^1 = \left\lceil p^1 \times \frac{N_3}{R} \right\rceil;$$

or when the rank is 2, a maximum quantity $M^1$ of frequency domain vectors reported by the terminal device for the first transport layer satisfies:

$$M^1 = \left\lceil p^1 \times \frac{N_3}{R} \right\rceil,$$

and a maximum quantity $M^2$ of frequency domain vectors reported for the second transport layer satisfies:

$$M^2 = \left\lceil p^2 \times \frac{N_3}{R} \right\rceil.$$

$p^1$ is a coefficient configured for one transport layer when the rank is 1, and 2 is a coefficient configured for two transport layers when the rank is 2. $p^1$ may be, for example, ½, ¼, or ⅔. $p^2$ may be, for example, ½, ¼, or ⅔. This is not limited in the embodiments of this application.

In this embodiment of this application, the value of the rank Z is greater than 2, and a maximum quantity (for example, denoted as $M_1$) that is of reported frequency domain vectors and that is corresponding to at least one of the Z transport layers may satisfy:

$$M_1 = \left\lfloor p_1 \times \frac{N_3}{R} \right\rfloor.$$

For ease of differentiation and description, a transport layer whose corresponding maximum quantity of reported frequency domain vectors satisfies $$M_1 = \left\lfloor p_1 \times \frac{N_3}{R} \right\rfloor$$

is denoted as a first-type transport layer.

The first-type transport layer may include at least a $Z^{th}$ transport layer in the Z transport layers. Certainly, the first-type transport layer may further include more transport layers in the Z transport layers. Optionally, the Z transport layers all belong to the first-type transport layer. Optionally, transport layers in the Z transport layers other than the first transport layer all belong to the first-type transport layer. Optionally, transport layers in the Z transport layers other than the first transport layer and the second transport layer all belong to the first-type transport layer.

The first-type transport layer is defined, so that a quantity of frequency domain vectors reported by the terminal device for the first-type transport layer can be reduced. For $$p \times \frac{N_3}{R},$$

if R is 2 and the value of p is any one of the foregoing listed values ½, ¼, ⅛, ⅔, ⅓, and ⅜, $$p \times \frac{N_3}{R}$$

may not be an integer. If $$p \times \frac{N_3}{R}$$

is not an integer, a value obtained by performing rounding up on $$p \times \frac{N_3}{R}$$

is different from a value obtained by performing rounding down on $$p \times \frac{N_3}{R}$$

In addition, the value obtained through rounding up is greater than the value obtained through rounding down.

For example, if $N_3$ is 13, R is 2, and p is ½, $$p \times \frac{N_3}{R} = \frac{13}{4}, \left\lceil p \times \frac{N_3}{R} \right\rceil = 4, \text{ and } \left\lfloor p \times \frac{N_3}{R} \right\rfloor = 3.$$

For example, if $N_3$ is 13, R is 2, and p is ½, $$p \times \frac{N_3}{R} = \frac{13}{2}, \left\lceil p \times \frac{N_3}{R} \right\rceil = 7, \text{ and } \left\lfloor p \times \frac{N_3}{R} \right\rfloor = 6.$$

Therefore, in this embodiment of this application, a maximum quantity $M_1$ of frequency domain vectors reported for the first-type transport layer is defined as $$M_1 = \left\lfloor p_1 \times \frac{N_3}{R} \right\rfloor,$$

so that a quantity of frequency domain vectors reported for an unimportant transport layer can be reduced.

The network device may further preconfigure a coefficient β for the terminal device by using signaling, and β may be used to determine a maximum quantity of weighting coefficients reported for each transport layer. A maximum quantity of weighting coefficients reported by the terminal device for the $z^{th}$ transport layer is $K^z = \lceil \beta \times 2LM^z \rceil$, where a value of β may be ¼, ½, or ¾.

Based on values of currently determined L and β, a value of L may be 2, 4, or 6, and a value of β may be ¼, ½, or ¾. In this case, $2LM^z$ in the formula is definitely a multiple of 4, and therefore $\beta \times 2LM^z$ is also an integer. Therefore, a value of $K^z$ is related to a value of $M^z$. If the maximum quantity that is of reported frequency domain vectors and that is determined for the first-type transport layer is determined through rounding down based on the foregoing descriptions, the value of $M^z$ may be reduced, and the value of $K^z$ may also be reduced.

Optionally, the Z transport layers further include at least one second-type transport layer.

In this embodiment of this application, the first-type transport layer and the second-type transport layer may be distinguished based on different factors. In an implementation, the first-type transport layer and the second-type transport layer may be distinguished based on different values of the coefficient p that are configured for each transport layer. In another implementation, the first-type transport layer and the second-type transport layer may be distinguished based on different layers.

The following describes in detail how to distinguish the first-type transport layer from the second-type transport layer and how to determine a quantity of frequency domain vectors and a quantity of weighting coefficients that are reported for the first-type transport layer.

In an implementation, the first-type transport layer and the second-type transport layer may be distinguished based on values of the coefficient p that are configured for each transport layer. A value that is of the coefficient p and that corresponds to the first-type transport layer is different from a value that is of the coefficient p and that corresponds to the second-type transport layer.

The maximum quantity $M_1$ of frequency domain vectors reported for the first-type transport layer satisfies:

$$M_1 = \left\lfloor p_1 \times \frac{N_3}{R} \right\rfloor,$$

and a maximum quantity $M_2$ of frequency domain vectors reported for the second-type transport layer satisfies $$M_2 = \left\lceil p_2 \times \frac{N_3}{R} \right\rceil \text{ or } M_2 = \left\lfloor p_2 \times \frac{N_3}{R} \right\rfloor,$$

where $p_1$ and $p_2$ are preconfigured coefficients, $p_1$ is used to determine the maximum quantity of frequency domain vectors reported for the first-type transport layer, and $p_2$ is used to determine the maximum quantity of frequency domain vectors reported for the second-type transport layer. In this embodiment, the first-type transport layer and the second-type transport layer are distinguished based on different values. Therefore, $p_1 \neq p_2$ and $0 < p_1 < p_2 \leq 1$.

As described above, the network device may preconfigure one group of values for different transport layers when the rank has different values. In an embodiment, a group of coefficients configured by the network device includes two optional values. In this case, the two optional values may be used to determine maximum quantities of frequency domain vectors reported for different transport layers when the rank is any value. In other words, values of the coefficients $p_1$ and $p_2$ may be taken from a plurality of preconfigured optional values. A transport layer corresponding to a relatively small value is a first-type transport layer, and a transport layer corresponding to a relatively large value is a second-type transport layer. In this embodiment of this application, if the rank is greater than 2, the Z transport layers include at least one first-type transport layer.

In an embodiment, Z is 4, and four transport layers are all first-type transport layers. In another embodiment, Z is 3, the first transport layer in three transport layers is a second-type transport layer, and both the second transport layer and the third transport layer in the three transport layers are first-type transport layers.

For example, the network device preconfigures a group of values {½, ¼} to determine values of the coefficient p for different transport layers when the rank has different values. If the rank is 1 and 2, a value that is of p and that corresponds to each transport layer may be ½. If the rank is 3, a value of p for the first transport layer may be ½, and values of p for the second transport layer and the third transport layer may be ¼. If the rank is 4, values of p for four transport layers may be all ¼.

Table 1 shows an example in which maximum quantities of reported frequency domain vectors and maximum quantities of reported weighting coefficients are determined for different transport layers when the rank is 1 to 4. In this table, it is assumed that a maximum quantity L of reported spatial domain vectors is 4, a value of p is ½ or ¼, a value of β is ½, and a value of R is 1. $p^z$ represents a value that is of p and that is configured for the $z^{th}$ transport layer, $M^z$ represents a maximum quantity of frequency domain vectors reported for the $z^{th}$ transport layer, $K^z$ represents a maximum quantity of weighting coefficients reported for the $z^{th}$ transport layer, and $$\sum_{z=1}^{Z} K^z$$

represents a total quantity of weighting coefficients reported for the Z transport layers.

TABLE 1

| Rank Z | Transport layer z | L | $p^z$ | $M^z$ | β | $K^z$ | $\sum_{z=1}^{Z} K^z$ |
|---|---|---|---|---|---|---|---|
| 1 | 1 | 4 | ½ | 7 | ½ | 28 | 28 |
| 2 | 1 | | | 7 | | 28 | 56 |
| | 2 | | | 7 | | 28 | |
| 3 | 1 | | ½ | 7 | | 28 | 52 |
| | 2 | | ¼ | 3 | | 12 | |
| | 3 | | ¼ | 3 | | 12 | |
| 4 | 1 | | ¼ | 3 | | 12 | 48 |
| | 2 | | | | | 12 | |
| | 3 | | | | | 12 | |
| | 4 | | | | | 12 | |

It should be noted that, maximum quantities of reported frequency domain vectors and maximum quantities of reported weighting coefficients that are determined for different transport layers when the rank is 1 and 2 and that are listed in Table 1 are shown for ease of understanding, and should not constitute any limitation on the embodiments of this application. The maximum quantities of reported frequency domain vectors and the maximum quantities of reported weighting coefficients that are determined for different transport layers when the rank is 1 and 2 may be determined according to the current technology. This is not limited in the embodiments of this application.

For another example, the network device preconfigures a group of values {¼, ⅛}. If the rank is 1 and 2, a value that is of p and that correspond to each transport layer may be ¼. If the rank is 3, a value for the first transport layer may be ¼, and values for the second transport layer and the third transport layer may be ⅛. If the rank is 4, values for four transport layers may be all ⅛.

Table 2 shows another example in which maximum quantities of reported frequency domain vectors and maximum quantities of reported weighting coefficients are determined for different transport layers when the rank is 1 to 4. In this table, it is assumed that a maximum quantity L of reported spatial domain vectors is 4, a value of p is ¼ or ⅛, a value of β is ½, and a value of R is 1. $p^z$ represents a value that is of p and that is configured for the $z^{th}$ transport layer, $M^z$ represents a maximum quantity of frequency domain vectors reported for the $z^{th}$ transport layer, $K^z$ represents a maximum quantity of weighting coefficients reported for the $z^{th}$ transport layer, and $$\sum_{z=1}^{Z} K^z$$

represents a total quantity of weighting coefficients reported for the Z transport layers.

TABLE 2

| Rank Z | Transport layer z | L | $p^z$ | $M^z$ | β | $K^z$ | $\sum_{z=1}^{Z} K^z$ |
|---|---|---|---|---|---|---|---|
| 1 | 1 | 4 | ¼ | 4 | ½ | 16 | 16 |
| 2 | 1 | | ¼ | 4 | | 16 | 32 |
| | 2 | | ¼ | 4 | | 16 | |
| 3 | 1 | | ¼ | 4 | | 16 | 24 |
| | 2 | | ⅛ | 1 | | 4 | |
| | 3 | | ⅛ | 1 | | 4 | |
| 4 | 1 | | ⅛ | 1 | | 4 | 16 |
| | 2 | | | | | 4 | |
| | 3 | | | | | 4 | |
| | 4 | | | | | 4 | |

It should be noted that, maximum quantities of reported frequency domain vectors and maximum quantities of reported weighting coefficients that are determined for different transport layers when the rank is 1 and 2 and that are listed in Table 2 are shown for ease of understanding, and should not constitute any limitation on the embodiments of this application. The maximum quantities of reported frequency domain vectors and the maximum quantities of reported weighting coefficients that are determined for different transport layers when the rank is 1 and 2 may be determined according to the current technology. This is not limited in the embodiments of this application.

It should be understood that for the plurality of groups of values of the coefficient p that are listed above, the maximum quantity of frequency domain vectors reported for each transport layer and the maximum quantity of weighting coefficients reported for each transport layer may be determined in the foregoing described manner (the maximum quantity of frequency domain vectors reported for the first-type transport layer is $$M_1 = \left\lfloor p_1 \times \frac{N_3}{R} \right\rfloor,$$

and the maximum quantity of frequency domain vectors reported for the second-type transport layer is $$M_2 = \left\lceil p_2 \times \frac{N_3}{R} \right\rceil).$$

Thus, the determined maximum quantity of frequency domain vectors reported for each transport layer and the determined maximum quantity of weighting coefficients reported for each transport layer may be shown in the foregoing Table 1 and Table 2. For brevity, examples are not given one by one herein.

As shown in Table 1 and Table 2, when the rank is 3, the first transport layer is a second-type transport layer, and the second transport layer and the third transport layer are first-type transport layers. When the rank is 4, all transport layers are first-type transport layers.

Definitions of the first-type transport layer and the second-type transport layer when the rank is 3 and 4 are not limited thereto. For example, when the rank is 3, the first transport layer and the second transport layer are second-type transport layers, and the third transport layer is a first-type transport layer. For another example, when the rank is 4, the first transport layer is a second-type transport layer, and the second transport layer, the third transport layer, and the fourth transport layer are first-type transport layers. For another example, when the rank is 4, the first transport layer and the second transport layer are second-type transport layers, and the third transport layer and the fourth transport layer are first-type transport layers. For brevity, examples are not given one by one herein.

It should be understood that the specific value of β, the specific value of L, the specific value of R, the specific values that are of the coefficient p and that correspond to each transport layer in the case of different ranks, and the maximum quantities of reported frequency domain vectors and the maximum quantities of reported weighting coefficients corresponding to each transport layer, and the total quantities of weighting coefficient that are determined in the case of different ranks are used as an example for ease of understanding. However, this is used as an example only for ease of understanding, and should not constitute any limitation on the embodiments of this application. Specific values of the foregoing listed parameters and a correspondence between a specific value and a transport layer are not limited in the embodiments of this application.

It should be further understood that Table 1 and Table 2 listed above are merely examples for ease of understanding, and should not constitute any limitation on the embodiments of this application. When L, $M^z$, and $K^z$ have the foregoing relationship, all parameters shown in the table are not necessarily configured. For example, $M^z$ and/or $K^z$ may not be shown in the table, but only $p^z$ and β are shown. Based on the coefficients p and β configured for each transport layer, the maximum quantity of frequency domain vectors reported for each transport layer and the maximum quantity of weighting coefficients reported for each transport layer may be determined. Therefore, a person skilled in the art may make appropriate variations or adjustments to the foregoing tables based on a same conception. Such variations or adjustments shall fall within the protection scope of this application.

In view of above, when there are two values of the preconfigured coefficient p, the values of the preconfigured coefficient p may include $p_{0,1}$ and $p_{0,2}$, and $0<p_{0,1}<p_{0,2}\leq 1$. The above listed {½, ¼}, {¼, ⅛}, {⅔, ⅓}, {⅜, ¼}, {½, ⅜}, or the like may be considered as several examples of specific values of {$p_{0,1}$, $p_{0,2}$}. For a first-type transport layer for which a relatively small value of p is configured, a corresponding value of $p_1$ may be $p_{0,1}$, and the maximum quantity $M_1$ of frequency domain vectors reported by the terminal device may satisfy $$M_1 = \left\lfloor p_{0,1} \times \frac{N_3}{R} \right\rfloor;$$

and for a second-type transport layer for which a relatively large value of p is configured, a corresponding value of $p_2$ may be $p_{0,2}$, and the maximum quantity $M_2$ of frequency domain vectors reported by the terminal device may satisfy $$M_2 = \left\lceil p_{0,2} \times \frac{N_3}{R} \right\rceil.$$

For a codebook whose rank is 1 and 2, a maximum quantity of weighting coefficients reported by the terminal device for each transport layer satisfies: $K^z \lceil \beta \times 2LM^z \rceil$.

In addition, depending on the latest development of 3GPP, for a codebook whose rank is 3 and 4, a total quantity of weighting coefficients reported by the terminal device for all transport layers is not more than $2K_0$, where $K_0$ is a maximum quantity of weighting coefficients reported for each transport layer when the rank is 1 or 2. In other words, $K_0 = K^1 = \lceil \beta \times 2LM^1 \rceil$. It may be learned from the foregoing Table 1 and Table 2 that, a maximum quantity of frequency domain vectors reported for each transport layer when the rank is 2 is the same as a maximum quantity of frequency domain vectors reported for one transport layer when the rank is 1, and a maximum quantity of weighting coefficients reported for each transport layer when the rank is 2 is the same as a maximum quantity of weighting coefficients reported for one transport layer when the rank is 1.

When the rank is 3 and 4, if the maximum quantity of frequency domain vectors reported for each transport layer is determined based on $$\left\lceil p \times \frac{N_3}{R} \right\rceil,$$

even though a value of p decreases by half, the obtained maximum quantity of reported frequency domain vectors does not necessarily decrease by half. Taking the parameters listed in the foregoing Table 1 as an example, $N_3=13$ and R=1 are substituted into $$\left\lceil p \times \frac{N_3}{R} \right\rceil$$

when p decreases from ½ to ¼, and the obtained maximum quantity of reported frequency domain vectors is changed from 7 to 4. It may be learned that the maximum quantity of reported frequency domain vectors does not decrease by half, and thus a determined maximum quantity of weighting coefficients reported for the same transport layer does not decrease by half either. Taking the values of p and β listed in Table 1 as an example, when the rank is 3, maximum quantities of weighting coefficients reported for the second transport layer and the third transport layer are 16. If a total quantity of weighting coefficients reported for three transport layers is further determined, the total quantity is 28+16+16=60, and a value of $K_0$ determined based on the rank being 1 is 28. In this case, a requirement that the total quantity of weighting coefficients reported by the terminal device when the rank is 3 does not exceed $2K_0$ cannot be satisfied. For another example, a maximum quantity of weighting coefficients reported for each transport layer when the rank is 4 is 16, and a total quantity of weighting coefficients reported for four transport layers is 64, but a requirement that the total quantity of weighting coefficients reported by the terminal device when the rank is 4 does not exceed $2K_0$ cannot be satisfied either.

However, in this embodiment of this application, the first-type transport layer is defined, and a maximum quantity of reported frequency domain vector corresponding to a transport layer for which a relatively small value of p is configured is determined through rounding down, so that a maximum quantity of reported frequency domain vectors can be reduced, and a maximum quantity of reported weighting coefficients can be reduced.

Furthermore, importance of each transport layer is also considered in the definition of the first-type transport layer. Generally, a relatively large value of p may be configured for a relatively important transport layer, and more weighting coefficients may be reported to ensure feedback precision. Therefore, a maximum quantity of reported frequency domain vectors may be determined through rounding up. However, a relatively small value of p may be configured for an unimportant transport layer, and fewer weighting coefficients may be reported to reduce feedback overheads. Therefore, a maximum quantity of reported frequency domain vectors may be determined through rounding down. Through the foregoing design, tradeoff efficiency between the feedback precision and the feedback overheads may be relatively high, so that the terminal device can perform feedback with relatively high precision by using fewer feedback overheads.

In an embodiment, a group of values of the coefficient p configured by the network device includes more optional values, for example, three or more optional values. A plurality of optional values in the group of values may be used to determine maximum quantities of frequency domain vectors reported for different transport layers when the rank is any value. In other words, values of the coefficients $p_1$ and $p_2$ may be taken from a plurality of preconfigured optional values. A transport layer for which a minimum value in the group of values is configured is a first-type transport layer, and a transport layer for which another value is configured is a second-type transport layer.

When there are three optional values of the preconfigured coefficient p, the values of the preconfigured coefficient p may include, for example, $p_{0,1}$, $p_{0,2}$, and $p_{0,3}$, and $0 < p_{0,1} < p_{0,3} < p_{0,2} \leq 1$.

Optionally, a transport layer for which the coefficient p is configured as a minimum value is a first-type transport layer, and a transport layer for which the coefficient p is configured as another value is a second-type transport layer. For example, a transport layer for which the coefficient p is configured as $p_{0,1}$ is a first-type transport layer, and a transport layer for which the coefficient p is configured as $p_{0,3}$ or $p_{0,2}$ is a second-type transport layer.

Optionally, a transport layer for which the coefficient p is configured as a maximum value is a second-type transport layer, and a transport layer for which the coefficient p is configured as another value is a first-type transport layer. For example, a transport layer for which the coefficient p is configured as $p_{0,2}$ is a second-type transport layer, and a transport layer for which the coefficient p is configured as $p_{0,1}$ or $p_{0,3}$ is a first-type transport layer.

In other words, when a value that is of the coefficient p and that is configured for a transport layer is a minimum value in a plurality of preconfigured values, the transport layer is a first-type transport layer. A maximum quantity $M_1$ of frequency domain vectors reported for the first-type transport layer satisfies:

$$M_1 = \left\lfloor p_1 \times \frac{N_3}{R} \right\rfloor.$$

When a value that is of the coefficient p and that is configured for a transport layer is a maximum value in a plurality of preconfigured values, the transport layer is a second-type transport layer. A maximum quantity $M_2$ of frequency domain vectors reported for the second-type transport layer satisfies:

$$M_2 = \left\lceil p_2 \times \frac{N_3}{R} \right\rceil.$$

When a value that is of the coefficient p and that is configured for a transport layer is an intermediate value in a plurality of preconfigured values, the transport layer may be defined as a first-type transport layer, a second-type transport layer, or a third-type transport layer. This is not limited in the embodiments of this application. A maximum quantity $M_2$ of frequency domain vectors reported for the transport layer satisfies:

$$M_2 = \left\lfloor p_2 \times \frac{N_3}{R} \right\rfloor \text{ or } M_2 = \left\lceil p_2 \times \frac{N_3}{R} \right\rceil.$$

Generally, for any value of the rank, the network device may configure a maximum of two optional values. For example, a value of the coefficient $p_1$ corresponding to the first-type transport layer is $p_{0,1}$, and the maximum quantity $M_1$ of frequency domain vectors reported for the first-type transport layer satisfies:

$$M_1 = \left\lfloor p_{0,1} \times \frac{N_3}{R} \right\rfloor;$$

and a value of the coefficient $p_2$ corresponding to the second-type transport layer is $p_{0,2}$, and the maximum quantity $M_2$ of frequency domain vectors reported for the second-type transport layer satisfies:

$$M_2 = \left\lceil p_{0,2} \times \frac{N_3}{R} \right\rceil.$$

For another example, a value of the coefficient $p_1$ corresponding to the first-type transport layer is $p_{0,1}$, and the maximum quantity $M_1$ of frequency domain vectors reported for the first-type transport layer satisfies:

$$M_1 = \left\lfloor p_{0,1} \times \frac{N_3}{R} \right\rfloor;$$

and a value of the coefficient $p_2$ corresponding to the second-type transport layer is $p_{0,3}$, and the maximum quantity $M_2$ of frequency domain vectors reported for the second-type transport layer satisfies:

$$M_2 = \left\lceil p_{0,3} \times \frac{N_3}{R} \right\rceil \text{ or } M_2 = \left\lfloor p_{0,3} \times \frac{N_3}{R} \right\rfloor \left\lceil p_{0,3} \times \frac{N_3}{R} \right\rceil.$$

With reference to specific values, quantities of reported frequency domain vectors and quantities of reported weighting coefficients that are configured for each transport layer when the rank is 1 to 4 are described in detail above. For brevity, examples are not described one by one herein.

In another implementation, the first-type transport layer and the second-type transport layer may be distinguished based on different layers. The first-type transport layer may be, for example, one or more less important layers in the Z transport layers. For example, the first-type transport layer may include a $Z^{th}$ transport layer in the Z transport layers. In contrast, the second-type transport layer may include one or more relatively important layers in the Z transport layers. For example, the second-type transport layer may include the first transport layer in the Z transport layers. Transport layers separately included in the first-type transport layer and the second-type transport layer may be predefined, for example, predefined in a protocol.

Optionally, Z is 3, the second transport layer and the third transport layer in three transport layers belong to the first-type transport layer, and the first transport layer in the three transport layers belongs to the second-type transport layer.

Optionally, Z is 3, the third transport layer in three transport layers belongs to the first-type transport layer, and the first transport layer and the second transport layer in the three transport layers belong to the second-type transport layer.

Optionally, Z is 4, the third transport layer and the fourth transport layer in four transport layers belong to the first-type transport layer, and the first transport layer and the second transport layer in the four transport layers belong to the second-type transport layer.

Optionally, Z is 4, the second transport layer, the third transport layer, and the fourth transport layer in four transport layers belong to the first-type transport layer, and the first transport layer in the four transport layers belongs to the second-type transport layer.

In this implementation, the first-type transport layer and the second-type transport layer are distinguished without depending on a value of the coefficient p. A manner of calculating the maximum quantity of frequency domain vectors reported for the first-type transport layer is different from a manner of calculating the maximum quantity of frequency domain vectors reported for the second-type transport layer. The maximum quantity of frequency domain vectors reported for the first-type transport layer may be determined by performing rounding down on $$p \times \frac{N_3}{R},$$

namely, $$M_1 = \left\lfloor p_1 \times \frac{N_3}{R} \right\rfloor;$$

and the maximum quantity of frequency domain vectors reported for the second-type transport layer may be determined by performing rounding up on $$p \times \frac{N_3}{R},$$

namely, $$M_2 = \left\lceil p_2 \times \frac{N_3}{R} \right\rceil.$$

Because the first-type transport layer and the second-type transport layer are not bound to a value of the coefficient p, a value of the coefficient $p_1$ used to determine the maximum quantity of frequency domain vectors reported for the first-type transport layer may be the same as or different from a value of the coefficient $p_2$ used to determine the maximum quantity of frequency domain vectors reported for the second-type transport layer. In other words, $0 < p_1 \leq p_2 \leq 1$.

The coefficients $p_1$ and $p_2$ may be taken from one or more preconfigured optional values. The one or more preconfigured optional values may include one or more of the following: $p_{0,1}$, $p_{0,2}$, and $p_{0,3}$, and $0 < p_{0,1} < p_{0,3} < p_{0,2} \leq 1$.

Even if values of the coefficients $p_1$ and $p_2$ are the same, the maximum quantities that are of reported frequency domain vectors and that are separately determined for the first-type transport layer and the second-type transport layer may be different. For example, $p_1 = p_2 = p_{0,1}$, the maximum quantity $M_1$ of frequency domain vectors reported for the first-type transport layer is $$M_1 = \left\lfloor p_{0,1} \times \frac{N_3}{R} \right\rfloor,$$

and the maximum quantity of frequency domain vectors reported for the second-type transport layer is $$M_2 = \left\lceil p_{0,1} \times \frac{N_3}{R} \right\rceil.$$

After maximum quantities of frequency domain vectors reported for different transport layers are determined, a maximum quantity of weighting coefficients reported for each transport layer may be further determined. The maximum quantity of weighting coefficients reported for each transport layer may be determined in the foregoing manner. For example, a maximum quantity that is of reported weighting coefficients and that is determined for the $z^{th}$ transport layer is $K^z = \lceil \beta \times 2LM^z \rceil$. For brevity, a specific value is not described as an example herein.

It should be noted that a maximum quantity of reported spatial domain vectors, a maximum quantity of reported frequency domain vectors, and a maximum quantity of reported weighting coefficients may be configured by binding a plurality of parameters. For example, the network device may bind different values of $\{L, p, \beta\}$ to configure the maximum quantity of reported spatial domain vectors, the maximum quantity of reported frequency domain vectors, and the maximum quantity of reported weighting coefficients for the terminal device.

A combination of values of the parameters $\{L, p, \beta\}$ may be taken from the following plurality of listed combinations shown in Table 3 to Table 9. Each index in Table 3 to Table 9 may represent one combination of the values of the parameters $\{L, p, \beta\}$. For example, the network device may indicate, by indicating an index corresponding to each combination, a parameter configured for the terminal device.

TABLE 3

| Index | L | p | β |
|---|---|---|---|
| 0 | 2 | 1/4 | 1/4 |
| 1 | 2 | 1/4 | 1/2 |
| 2 | 4 | 1/4 | 1/4 |

TABLE 3-continued

| Index | L | p | β |
|---|---|---|---|
| 3 | 4 | 1/4 | 1/2 |
| 4 | 6 | 1/4 | 1/2 |
| 5 | 6 | 1/4 | 3/4 |

TABLE 4

| Index | L | p | β |
|---|---|---|---|
| 0 | 2 | 1/4 | 1/4 |
| 1 | 2 | 1/4 | 1/2 |
| 2 | 4 | 1/4 | 1/4 |
| 3 | 4 | 1/4 | 1/2 |
| 4 | 4 | 1/2 | 1/2 |
| 5 | 4 | 1/2 | 3/4 |

TABLE 5

| Index | L | p | β |
|---|---|---|---|
| 0 | 2 | 1/4 | 1/4 |
| 1 | 2 | 1/4 | 1/2 |
| 2 | 4 | 1/4 | 1/4 |
| 3 | 4 | 1/4 | 1/2 |
| 4 | 4 | 1/2 | 1/2 |

TABLE 6

| Index | L | p | β |
|---|---|---|---|
| 0 | 2 | 1/4 | 1/4 |
| 1 | 2 | 1/4 | 1/2 |
| 2 | 4 | 1/4 | 1/4 |
| 3 | 4 | 1/2 | 1/4 |
| 4 | 4 | 1/2 | 1/2 |

TABLE 7

| Index | L | p | β |
|---|---|---|---|
| 0 | 2 | 1/4 | 1/4 |
| 1 | 2 | 1/4 | 1/2 |
| 2 | 2 | 1/2 | 1/2 |
| 3 | 2 | 1/2 | 3/4 |

TABLE 8

| Index | L | p | β |
|---|---|---|---|
| 0 | 2 | 1/4 | 1/4 |
| 1 | 2 | 1/4 | 1/2 |
| 2 | 4 | 1/4 | 1/4 |
| 3 | 4 | 1/4 | 1/2 |
| 4 | 4 | 1/2 | 1/2 |
| 5 | 4 | 1/2 | 3/4 |
| 6 | 6 | 1/4 | 1/2 |
| 7 | 6 | 1/4 | 3/4 |

TABLE 9

| Index | L | p | β |
|---|---|---|---|
| 0 | 2 | 1/4 | 1/4 |
| 1 | 2 | 1/4 | 1/2 |
| 2 | 4 | 1/4 | 1/4 |

TABLE 9-continued

| Index | L | p | β |
|---|---|---|---|
| 3 | 4 | 1/4 | 1/2 |
| 4 | 4 | 1/2 | 1/2 |
| 5 | 6 | 1/4 | 1/2 |
| 6 | 6 | 1/4 | 3/4 |

After determining the maximum quantity of reported spatial domain vectors, and the maximum quantity of frequency domain vectors and the maximum quantity of weighting coefficients that are reported for each transport layer, the terminal device may perform channel measurement based on a received reference signal to determine and feed back the spatial domain vector, the frequency domain vector, and the weighting coefficient that are used to construct the precoding matrix.

For ease of understanding, the following briefly describes a process in which the terminal device determines a to-be-reported spatial domain vector, a to-be-reported frequency domain vector, and a to-be-reported weighting coefficient in a dual-domain compression codebook feedback manner.

The terminal device may perform channel measurement based on the received reference signal such as a CSI-RS, to determine a spatial domain vector, a frequency domain vector, and a weighting coefficient that are used to construct a precoding matrix of each frequency domain unit.

In an implementation, the terminal device may estimate a channel matrix based on a reference signal, and determine a precoding vector of each frequency domain unit on each transport layer by performing singular value decomposition on the channel matrix or a covariance matrix of the channel matrix, or by performing eigenvalue decomposition on the covariance matrix of the channel matrix. It should be understood that for a method for determining a precoding vector through channel measurement, refer to the current technology. For brevity, detailed descriptions of the process are omitted herein.

The terminal device may construct, based on the precoding vector of each frequency domain unit on each transport layer, a space-frequency matrix corresponding to each transport layer, and may determine, by performing spatial-domain DFT and frequency-domain DFT on the space-frequency matrix, at least one to-be-reported spatial domain vector, at least one frequency domain vector, and at least one weighting coefficient corresponding to at least one space-frequency vector pair.

In this embodiment of this application, the Z transport layers share same L spatial domain vectors, and the Z transport layers separately use respective independent frequency domain vectors and weighting coefficients. For the $z^{th}$ transport layer, the terminal device may feed back a maximum of $M^z$ frequency domain vectors and weighting coefficients corresponding to some or all space-frequency vector pairs in $L \times M^z$ space-frequency vector pairs.

Because the L spatial domain vectors are spatial domain vectors shared by the Z transport layers, the terminal device may determine the L spatial domain vectors based on a space-frequency matrix of a transport layer in the Z transport layers. For example, the terminal device may determine the L spatial domain vectors based on a space-frequency matrix of the first transport layer in the Z transport layers; or the terminal device may determine the L spatial domain vectors based on a space-frequency matrix of each of the Z transport layers.

In an implementation, the terminal device may perform spatial-domain DFT on the space-frequency matrix of each of the Z transport layers to determine the relatively strong L spatial domain vectors. Spatial-domain DFT may be performed on each space-frequency matrix by using, for example, a formula $c'=u_s^H H^z$, where $H^z$ represents a space-frequency matrix of the $z^{th}$ transport layer. For a dual-polarized antenna, a dimension of a space-frequency matrix may be $2N_s \times N_3$. $H^z$ may be a space-frequency matrix in each of two polarization directions, and a dimension thereof is $N_s \times N_3$; or $H^z$ may be a space-frequency matrix in two polarization directions, and a dimension thereof is $2N_s \times N_3$. This is not limited in the embodiments of this application.

$U_s$ represents a matrix constructed by using a plurality of (for example, $N_s$) spatial domain vectors in a predefined spatial domain vector set. Herein, for ease of differentiation and description, a matrix $U_s$ that is constructed by using a plurality of spatial domain vectors used to construct a precoding matrix and on which spatial-domain DFT is performed is referred to as a spatial domain basis. $U_s$ may be, for example, the foregoing defined spatial domain vector set $B_s$ that does not undergo over-sampling or a subset of a spatial domain vector set that undergoes over-sampling, such as $B_s^{os}$. A dimension of $U_s$ may be $N_s \times N_s$, to correspond to a space-frequency matrix in one polarization direction. Alternatively, the dimension of $U_s$ may be determined by using the foregoing defined spatial domain vector set $B_s$ or $B_s^{os}$. For example, the spatial domain vector set $B_s$ or $B_s^{os}$ is spliced to obtain $$\begin{bmatrix} B_s & 0 \\ 0 & B_s \end{bmatrix} \text{ or } \begin{bmatrix} B_s^{os} & 0 \\ 0 & B_s^{os} \end{bmatrix}$$

dimension of $U_s$ may be $2N_s \times 2N_s$, to correspond to a space-frequency matrix in two polarization directions.

C' represents a coefficient matrix obtained through spatial-domain DFT, and a dimension thereof may be $L \times N_s$ or $2L \times 2N_s$.

If z is taken in a range from 1 to Z, a coefficient matrix whose 2Z dimensions are $L \times N_s$ or a coefficient matrix whose Z dimensions are $2L \times 2N_s$ may be obtained through spatial-domain DFT. The coefficient matrix whose 2Z dimensions are $L \times N_s$ includes Z coefficient matrices corresponding to each of the two polarization directions.

The terminal device may determine the relatively strong L spatial domain vectors based on a plurality of coefficient matrices in one polarization direction, or may determine the relatively strong L spatial domain vectors based on a plurality of coefficient matrices in two polarization directions. The relatively strong L spatial domain vectors may be spatial domain vectors shared by the Z transport layers and the two polarization directions. For example, the terminal device may determine L rows with a relatively large sum of modular squares based on a value of a sum of modular squares of each row of elements in each coefficient matrix in a same polarization direction. Sequence numbers of L rows with a relatively large sum of modular squares that is determined by using Z coefficient matrices may be sequence numbers of L columns in a spatial domain basis, and therefore the L spatial domain vectors may be determined.

The $M^z$ frequency domain vectors reported by the terminal device for the $z^{th}$ transport layer may be determined based on the space-frequency matrix of the $z^{th}$ transport layer. Spatial-domain DFT and frequency-domain DFT may be performed on the space-frequency matrix of the $z^{th}$ transport layer by using, for example, a formula $C=U_s^H H^z U_f$, or by further right-multiplying $U_f$ based on the foregoing $c'=U_s^H H^z$. For a dual-polarized antenna, a dimension of a coefficient matrix C obtained in this way may be $2L \times M^z$.

C represents a coefficient matrix obtained through spatial-domain DFT and frequency-domain DFT. $U_f$ represents a matrix constructed by using a plurality of (for example, $N_3$) frequency domain vectors in a predefined frequency domain vector set, and a dimension thereof may be $N_3 \times N_3$. $U_f$ may be, for example, the foregoing defined frequency domain vector set $B_f$ that does not undergo over-sampling or a subset of a frequency domain vector set that undergoes over-sampling, such as $B_f^{os}$. Herein, for ease of differentiation and description, a matrix $U_f$ that is constructed by using a plurality of frequency domain vectors used to construct a precoding matrix and on which frequency-domain DFT is performed is referred to as a frequency domain basis.

The terminal device may determine relatively strong $M^z$ columns from the coefficient matrix C. For example, the terminal device may determine $M^z$ columns with a relatively large sum of modular squares based on a value of a sum of modular squares of each column of elements in the coefficient matrix C. The relatively strong $M^z$ columns in the coefficient matrix C may be used to determine selected $M^z$ frequency domain vectors in a frequency domain basis. For example, sequence numbers of the relatively strong $M^z$ columns in the coefficient matrix C may be sequence numbers of selected $M^z$ column vectors in the frequency domain basis, and therefore the $M^z$ frequency domain vectors may be determined.

In addition, the coefficient matrix C may be further used to determine a weighting coefficient corresponding to each space-frequency vector pair. As described above, an $l^{th}$ row in the coefficient matrix C may correspond to an $l^{th}$ spatial domain vector in a first polarization direction in 2L spatial domain vectors, and an $(L+l)^{th}$ row in the coefficient matrix C may correspond to an $l^{th}$ spatial domain vector in a second polarization direction in the 2L spatial domain vectors. An $m^{th}$ column in the coefficient matrix C may correspond to an $m^{zth}$ frequency domain vector in the $M^z$ frequency domain vectors.

It should be understood that the foregoing method for determining a spatial domain vector, a frequency domain vector, and a weighting coefficient is merely an example, and should not constitute any limitation on the embodiments of this application. For example, the method for determining a spatial domain vector, a frequency domain vector, and a weighting coefficient may be the same as a method for determining a beam vector and a weighting coefficient of the beam vector in a type II codebook feedback manner defined in the NR protocol TS38.214 release 15 (R15). In addition, for example, the terminal device may alternatively determine a spatial domain vector, a frequency domain vector, and a weighting coefficient by using an existing estimation algorithm such as a multiple signal classification algorithm (MUSIC), a Bartlett algorithm, or an estimation of signal parameters via rotation invariant technique algorithm (ESPRIT). For brevity, examples are not described herein. In addition, a sequence of determining a spatial domain vector, a frequency domain vector, and a weighting coefficient is not limited in the embodiments of this application.

It should be further understood that only an example in which the Z transport layers and the two polarization directions share the L spatial domain vectors, and each transport layer uses a respective independent frequency domain vector is used above to describe a process in which the terminal device determines a spatial domain vector, a frequency domain vector, and a weighting coefficient. However, this should not constitute any limitation on the embodiments of this application. When the Z transport layers separately use respective independent spatial domain vectors or the two polarization directions separately use respective independent spatial domain vectors, the terminal device may still determine a spatial domain vector, a frequency domain vector, and a weighting coefficient in a manner similar to that described above.

It should be noted that when a predefined spatial domain vector set includes a plurality of subsets obtained through over-sampling extension, and/or when a predefined frequency domain vector set includes a plurality of subsets obtained through over-sampling extension, a process in which the terminal device performs spatial-domain DFT and frequency-domain DFT on a space-frequency matrix to determine a spatial domain vector, a frequency domain vector, and a weighting coefficient is similar to the foregoing descriptions. For details, refer to the current technology. For brevity, detailed descriptions of the process are omitted herein.

After determining the spatial domain vector, the frequency domain vector, and the weighting coefficient that are used to construct the precoding matrix, the terminal device may indicate, by using the first indication information, the to-be-reported spatial domain vector, the to-be-reported frequency domain vector, and the to-be-reported weighting coefficient.

The terminal device may report the spatial domain vector and the frequency domain vector by using the first indication information by using a plurality of different methods.

For example, the terminal device may indicate L spatial domain vectors by using an index of a combination of the L spatial domain vectors, or may separately indicate the L spatial domain vectors by using respective indexes of the L spatial domain vectors. When a spatial domain vector set is extended to a plurality of subsets by using an over-sampling factor, the terminal device may further indicate, by using the first indication information, indexes of subsets to which the L spatial domain vectors belong.

For another example, the terminal device may indicate a frequency domain vector by using an index of a combination of frequency domain vectors corresponding to each transport layer. For example, for the $z^{th}$ transport layer, the $M^z$ frequency domain vectors are indicated by using an index of a combination of the $M^z$ frequency domain vectors; or the terminal device may separately indicate the $M^z$ frequency domain vectors by using respective indexes of the $M^z$ frequency domain vectors. When a frequency domain vector set is extended to a plurality of subsets by using an over-sampling factor, the terminal device may further indicate, by using the first indication information, indexes of subsets to which the $M^z$ frequency domain vectors belong.

The terminal device may report the weighting coefficient by using the first indication information by using a plurality of different methods.

For example, the terminal device may indicate the weighting coefficient by using a quantized value, an index of a quantized value, or a non-quantized value. An indication manner of the weighting coefficient is not limited in the embodiments of this application, provided that a peer end knows the weighting coefficient. In this embodiment of this application, for ease of description, information used to indicate the weighting coefficient is referred to as quantization information of the weighting coefficient. The quantization information may be, for example, a quantized value, an index, or any other information that may be used to indicate the weighting coefficient.

For a method for reporting the spatial domain vector, the frequency domain vector, and the weighting coefficient by the terminal device by using the first indication information, refer to the current technology. For brevity, details are not described herein.

In operation 220, the terminal device sends the first indication information. Correspondingly, the network device receives the first indication information.

The first indication information may be, for example, information included in a PMI, or may be a PMI. The first indication information may be, for example, carried in a CSI report, and is transmitted to the network device by using a physical uplink resource. The physical uplink resource may be, for example, a physical uplink control channel (PUCCH) resource or a physical uplink shared channel (PUSCH) resource. This is not limited in the embodiments of this application.

It should be understood that for a process in which the terminal device sends the PMI or the CSI report to the network device, refer to the current technology. For brevity, detailed descriptions of the process are omitted herein.

In operation 230, the network device determines precoding matrices of one or more frequency domain units according to the first indication information.

The network device may first determine, according to the first indication information, spatial domain vectors, frequency domain vectors, and weighting coefficients that are used to construct precoding vectors of one or more frequency domain units on each transport layer, and then determine a precoding matrix of each frequency domain unit.

A process in which the network device parses the first indication information is similar to a process in which the terminal device generates the first indication information. For brevity, detailed descriptions of the process are omitted herein.

The L spatial domain vectors reported by the terminal device are spatial domain vectors shared by the Z transport layers, the $M^z$ frequency domain vectors reported by the terminal device are frequency domain vectors reported for the $z^{th}$ transport layer, and the $K^z$ weighting coefficients reported by the terminal device are weighting coefficients reported for the $z^{th}$ transport layer. In this case, the L spatial domain vectors, and the $M^z$ frequency domain vectors and the $K^z$ weighting coefficients that are reported for the $z^{th}$ transport layer may be used to construct the space-frequency matrix of the $z^{th}$ transport layer. The space-frequency matrix of the $z^{th}$ transport layer may be obtained by performing weighted summation on a space-frequency component matrix constructed by using the L spatial domain vectors and the $M^z$ frequency domain vectors. Thus, precoding vectors of one or more frequency domain units on the $z^{th}$ transport layer may be obtained.

Thereafter, the network device may construct, based on determined precoding vectors of an $n^{th}$ frequency domain unit ($1 \leq n \leq N_3$ and n is an integer) on each transport layer, a precoding matrix corresponding to the $n^{th}$ frequency domain unit. For example, the precoding vectors corresponding to the $n^{th}$ frequency domain unit are successively arranged in a sequence of the first transport layer to the $Z^{th}$ transport layer in the Z transport layers, and normalization processing may be performed to obtain the precoding matrix corresponding to the $n^{th}$ frequency domain unit.

It should be understood that the foregoing described method for determining, based on the spatial domain vector, the frequency domain vector, and the weighting coefficient that are indicated by the first indication information, the precoding vector corresponding to each frequency domain unit on each transport layer, and further determining the precoding matrix corresponding to each frequency domain unit is merely an example, and should not constitute any limitation on the embodiments of this application. A method for determining a precoding matrix by the network device based on a spatial domain vector, a frequency domain vector, and a weighting coefficient is not limited in the embodiments of this application.

Based on the foregoing method, the first-type transport layer is defined, and maximum quantities of frequency domain vectors and maximum quantities of weighting coefficients that are reported for some transport layers in a high-rank codebook are reduced. Overall, a quantity of frequency domain vectors and a quantity of weighting coefficients that are fed back by the terminal device are reduced, and therefore feedback overheads are reduced. In addition, because importance of each layer is considered in the definition of the first-type transport layer, a larger quantity of reported frequency domain vectors and a larger quantity of reported weighting coefficients are configured for a more important transport layer, and a smaller quantity of reported frequency domain vectors and a smaller quantity of reported weighting coefficients are configured for a less important transport layer. Therefore, overall, feedback precision is less affected. Therefore, tradeoff efficiency between the feedback overheads and the feedback precision is relatively high. In this way, relatively high feedback precision can be obtained by using fewer feedback overheads, thereby ensuring system transmission performance.

It should be understood that sequence numbers of the processes do not mean execution sequences in the foregoing embodiments. The execution sequences of the processes should be determined according to functions and internal logic of the processes, and should not be construed as any limitation on the implementation processes of the embodiments of this application.

The method provided in the embodiments of this application is described above in detail with reference to FIG. 2. The apparatuses provided in the embodiments of this application are described below in detail with reference to FIG. 3 to FIG. 5.

Figure 3:
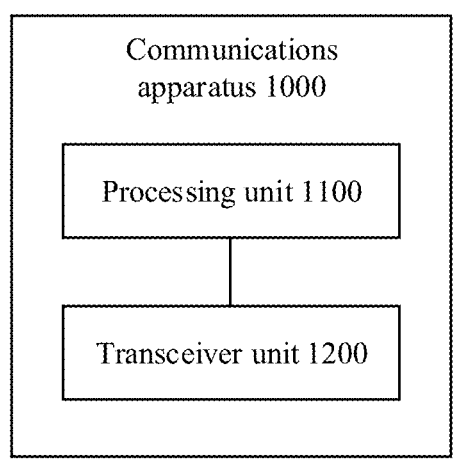
FIG. 3 is a diagram of a communications apparatus according to an embodiment of this application.

FIG. 3 is a diagram of a communications apparatus according to an embodiment of this application. As shown in FIG. 3, a communications apparatus 1000 may include a processing unit 1100 and a transceiver unit 1200.

In an embodiment, the communications apparatus 1000 may correspond to the terminal device in the foregoing method embodiment, for example, may be a terminal device or a chip disposed in the terminal device.

The processing unit 1100 is configured to generate first indication information, where the first indication information is used to indicate a spatial domain vector, a frequency domain vector, and a weighting coefficient that are used to construct a precoding matrix; and when a value of a rank Z is greater than 1, Z transport layers include at least one first-type transport layer, and a maximum quantity $M_1$ of frequency domain vectors reported for the first-type transport layer satisfies:

$$M_1 = \left\lfloor p_1 \times \frac{N_3}{R} \right\rfloor,$$

where $p_1$ is a preconfigured coefficient and is used to determine the maximum quantity of frequency domain vectors reported for the first-type transport layer, $1 \geq p_1 > 0$, R is a preconfigured value, $N_3$ is a length of a frequency domain vector, $Z > 2$, $1 \leq z \leq Z$, and z, R, $N_3$, and Z are all positive integers. The transceiver unit 1200 is configured to send the first indication information.

Optionally, the Z transport layers further include at least one second-type transport layer, and a maximum quantity $M_2$ of frequency domain vectors reported for the second-type transport layer satisfies:

$$M_2 = \left\lceil p_2 \times \frac{N_3}{R} \right\rceil \text{ or } M_2 = \left\lfloor p_2 \times \frac{N_3}{R} \right\rfloor,$$

where $p_2$ is a preconfigured coefficient and is used to determine the maximum quantity of frequency domain vectors reported for the second-type transport layer, and $1 \geq p_2 > p_1 > 0$.

Optionally, $p_1$ and $p_2$ are taken from a plurality of preconfigured optional values, the plurality of preconfigured optional values include $p_{0,1}$ and $p_{0,2}$, and $0 < p_{0,1} < p_{0,2} \leq 1$.

Optionally, $p_1$ and $p_2$ are taken from a plurality of preconfigured optional values, the plurality of preconfigured optional values include $p_{0,1}$, $p_{0,2}$, and $p_{0,3}$, and $0 < p_{0,1} < p_{0,3} < p_{0,2} \leq 1$.

Optionally, $p_1 = p_{0,1}$ and $p_2 = p_{0,2}$; and the maximum quantity $M_1$ of frequency domain vectors reported for the first-type transport layer satisfies:

$$M_1 = \left\lfloor p_{0,1} \times \frac{N_3}{R} \right\rfloor,$$

and the maximum quantity $M_2$ of frequency domain vectors reported for the second-type transport layer satisfies:

$$M_2 = \left\lceil p_{0,2} \times \frac{N_3}{R} \right\rceil.$$

Optionally, $p_1 = p_{0,1}$ and $p_2 = p_{0,3}$; and the maximum quantity $M_1$ of frequency domain vectors reported for the first-type transport layer satisfies:

$$M_1 = \left\lfloor p_{0,1} \times \frac{N_3}{R} \right\rfloor,$$

and the maximum quantity $M_2$ of frequency domain vectors reported for the second-type transport layer satisfies:

$$M_2 = \left\lceil p_{0,3} \times \frac{N_3}{R} \right\rceil \text{ or } M_2 = \left\lfloor p_{0,3} \times \frac{N_3}{R} \right\rfloor.$$

Optionally, the Z transport layers further include at least one second-type transport layer, and a maximum quantity $M_2$ of frequency domain vectors reported for the second-type transport layer satisfies:

$$M_2 = \left\lceil p_2 \times \frac{N_3}{R} \right\rceil,$$

where $p_2$ is a preconfigured coefficient and is used to determine the maximum quantity of frequency domain vectors reported for the second-type transport layer, and $1 \geq p_2 \geq p_1 > 0$.

Optionally, $p_1$ and $p_2$ are taken from one or more preconfigured optional values, the one or more preconfigured optional values include one or more of $p_{0,1}$, $p_{0,2}$, and $p_{0,3}$, and $0 < p_{0,1} < p_{0,3} < p_{0,2} \leq 1$.

Optionally, the Z transport layers all belong to the first-type transport layer.

Optionally, a $Z^{th}$ transport layer in the Z transport layers belongs to the first-type transport layer, and the first transport layer in the Z transport layers belongs to the second-type transport layer.

Optionally, Z is 3, the first transport layer in three transport layers belongs to the second-type transport layer, and the second transport layer and the third transport layer in the three transport layers belong to the first-type transport layer.

Optionally, Z is 3, the first transport layer and the second transport layer in three transport layers belong to the second-type transport layer, and the third transport layer in the three transport layers belongs to the first-type transport layer.

Optionally, Z is 4, the first transport layer and the second transport layer in four transport layers belong to the second-type transport layer, and the third transport layer and the fourth transport layer in the four transport layers belong to the first-type transport layer.

Optionally, Z is 4, the first transport layer in four transport layers belongs to the second-type transport layer, and the second transport layer, the third transport layer, and the fourth transport layer in the four transport layers belong to the first-type transport layer.

It should be understood that the communications apparatus 1000 may correspond to the terminal device in the method 200 in the embodiments of this application, and the communications apparatus 1000 may include units configured to perform the method performed by the terminal device in the method 200 in FIG. 2. In addition, the units in the communications apparatus 1000 and the foregoing other operations and/or functions are separately used to implement corresponding procedures of the method 200 in FIG. 2.

When the communications apparatus 1000 is configured to perform the method 200 in FIG. 2, the processing unit 1100 may be configured to perform operation 210 in the method 200, and the transceiver unit 1200 may be configured to perform operation 220 in the method 200. It should be understood that processes of performing the foregoing corresponding operations by the units are described in detail in the foregoing method embodiment. For brevity, details are not described herein again.

Figure 4:
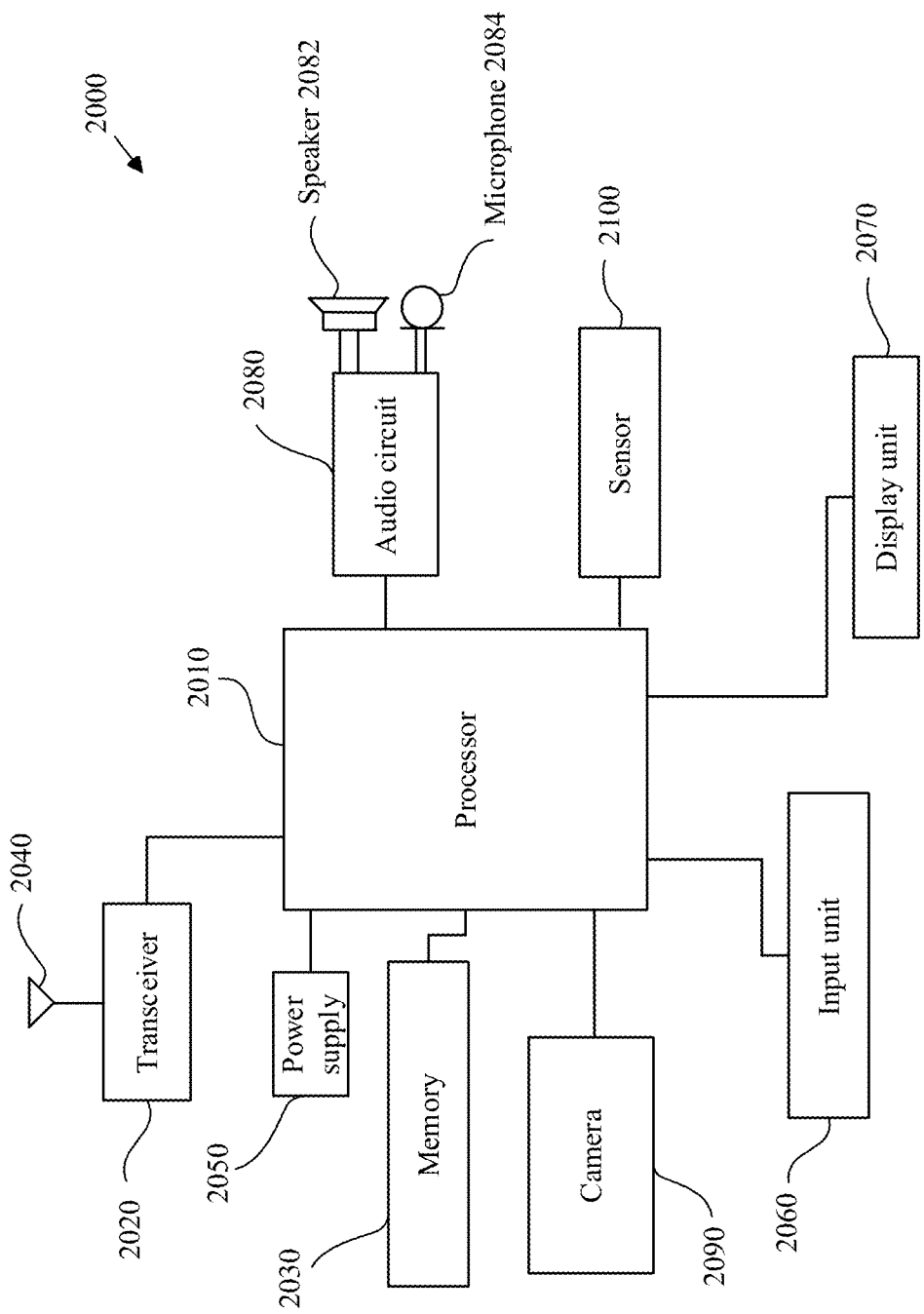
FIG. 4 is a diagram of a terminal device according to an embodiment of this application.

It should be further understood that when the communications apparatus 1000 is a terminal device, the transceiver unit 1200 in the communications apparatus 1000 may correspond to a transceiver 2020 in a terminal device 2000 shown in FIG. 4, and the processing unit 1100 in the communications apparatus 1000 may correspond to a processor 2010 in the terminal device 2000 shown in FIG. 4.

It should be further understood that when the communications apparatus 1000 is a chip disposed in a terminal device, the transceiver unit 1200 in the communications apparatus 1000 may be an input/output interface.

In an embodiment, the communications apparatus 1000 may correspond to the network device in the foregoing method embodiment, for example, may be a network device or a chip disposed in the network device.

The communications apparatus may include a processing unit 1100 and a transceiver unit 1200. The transceiver unit 1200 is configured to receive first indication information, where the first indication information is used to indicate a spatial domain vector, a frequency domain vector, and a weighting coefficient that are used to construct a precoding matrix; and when a value of a rank Z is greater than 1, Z transport layers include at least one first-type transport layer, and a maximum quantity $M_1$ of frequency domain vectors reported for the first-type transport layer satisfies:

$$M_1 = \left\lfloor p_1 \times \frac{N_3}{R} \right\rfloor,$$

where $p_1$ is a preconfigured coefficient and is used to determine the maximum quantity of frequency domain vectors reported for the first-type transport layer, $1 \geq p_1 > 0$, R is a preconfigured value, $N_3$ is a length of a frequency domain vector, $Z > 2$, $1 \leq z \leq Z$, and z, R, $N_3$, and Z are all positive integers. The processing unit 1100 is configured to determine a precoding matrix of each frequency domain unit according to the first indication information.

Optionally, the Z transport layers further include at least one second-type transport layer, and a maximum quantity $M_2$ of frequency domain vectors reported for the second-type transport layer satisfies:

$$M_2 = \left\lceil p_2 \times \frac{N_3}{R} \right\rceil \text{ or } M_2 = \left\lfloor p_2 \times \frac{N_3}{R} \right\rfloor,$$

where $p_2$ is a preconfigured coefficient and is used to determine the maximum quantity of frequency domain vectors reported for the second-type transport layer, and $1 \geq p_2 > p_1 > 0$.

Optionally, $p_1$ and $p_2$ are taken from a plurality of preconfigured optional values, the plurality of preconfigured optional values include $p_{0,1}$ and $p_{0,2}$, and $0 < p_{0,1} < p_{0,2} \leq 1$.

Optionally, $p_1$ and $p_2$ are taken from a plurality of preconfigured optional values, the plurality of preconfigured optional values include $p_{0,1}$, $p_{0,2}$, and $p_{0,3}$, and $0 < p_{0,1} < p_{0,3} < p_{0,2} \leq 1$.

Optionally, $p_1 = p_{0,1}$ and $p_2 = p_{0,2}$; and the maximum quantity $M_1$ of frequency domain vectors reported for the first-type transport layer satisfies:

$$M_1 = \left\lfloor p_{0,1} \times \frac{N_3}{R} \right\rfloor,$$

and the maximum quantity $M_2$ of frequency domain vectors reported for the second-type transport layer satisfies:

$$M_2 = \left\lceil p_{0,2} \times \frac{N_3}{R} \right\rceil.$$

Optionally, $p_1 = p_{0,1}$ and $p_2 = p_{0,3}$; and the maximum quantity $M_1$ of frequency domain vectors reported for the first-type transport layer satisfies:

$$M_1 = \left\lfloor p_{0,1} \times \frac{N_3}{R} \right\rfloor,$$

and the maximum quantity $M_2$ of frequency domain vectors reported for the second-type transport layer satisfies:

$$M_2 = \left\lceil p_{0,3} \times \frac{N_3}{R} \right\rceil \text{ or } M_2 = \left\lfloor p_{0,3} \times \frac{N_3}{R} \right\rfloor.$$

Optionally, the Z transport layers further include at least one second-type transport layer, and a maximum quantity $M_2$ of frequency domain vectors reported for the second-type transport layer satisfies:

$$M_2 = \left\lceil p_2 \times \frac{N_3}{R} \right\rceil,$$

where $p_2$ is a preconfigured coefficient and is used to determine the maximum quantity of frequency domain vectors reported for the second-type transport layer, and $1 \geq p_2 \geq p_1 > 0$.

Optionally, $p_1$ and $p_2$ are taken from one or more preconfigured optional values, the one or more preconfigured optional values include one or more of $p_{0,1}$, $p_{0,2}$, and $p_{0,3}$, and $0 < p_{0,1} < p_{0,3} < p_{0,2} \leq 1$.

Optionally, the Z transport layers all belong to the first-type transport layer.

Optionally, a $Z^{th}$ transport layer in the Z transport layers belongs to the first-type transport layer, and the first transport layer in the Z transport layers belongs to the second-type transport layer.

Optionally, Z is 3, the first transport layer in three transport layers belongs to the second-type transport layer, and the second transport layer and the third transport layer in the three transport layers belong to the first-type transport layer.

Optionally, Z is 3, the first transport layer and the second transport layer in three transport layers belong to the second-type transport layer, and the third transport layer in the three transport layers belongs to the first-type transport layer.

Optionally, Z is 4, the first transport layer and the second transport layer in four transport layers belong to the second-type transport layer, and the third transport layer and the fourth transport layer in the four transport layers belong to the first-type transport layer.

Optionally, Z is 4, the first transport layer in four transport layers belongs to the second-type transport layer, and the second transport layer, the third transport layer, and the fourth transport layer in the four transport layers belong to the first-type transport layer.

It should be understood that the communications apparatus 1000 may correspond to the network device in the method 200 in the embodiments of this application, and the communications apparatus 1000 may include units configured to perform the method performed by the network device in the method 200 in FIG. 2. In addition, the units in the communications apparatus 1000 and the foregoing other operations and/or functions are separately used to implement corresponding procedures of the method 200 in FIG. 2.

When the communications apparatus 1000 is configured to perform the method 200 in FIG. 2, the processing unit 1100 may be configured to perform operation 230 in the method 200, and the transceiver unit 1200 may be configured to perform operation 220 in the method 200. It should be understood that processes of performing the foregoing corresponding operations by the units are described in detail in the foregoing method embodiment. For brevity, details are not described herein again.

Figure 5:
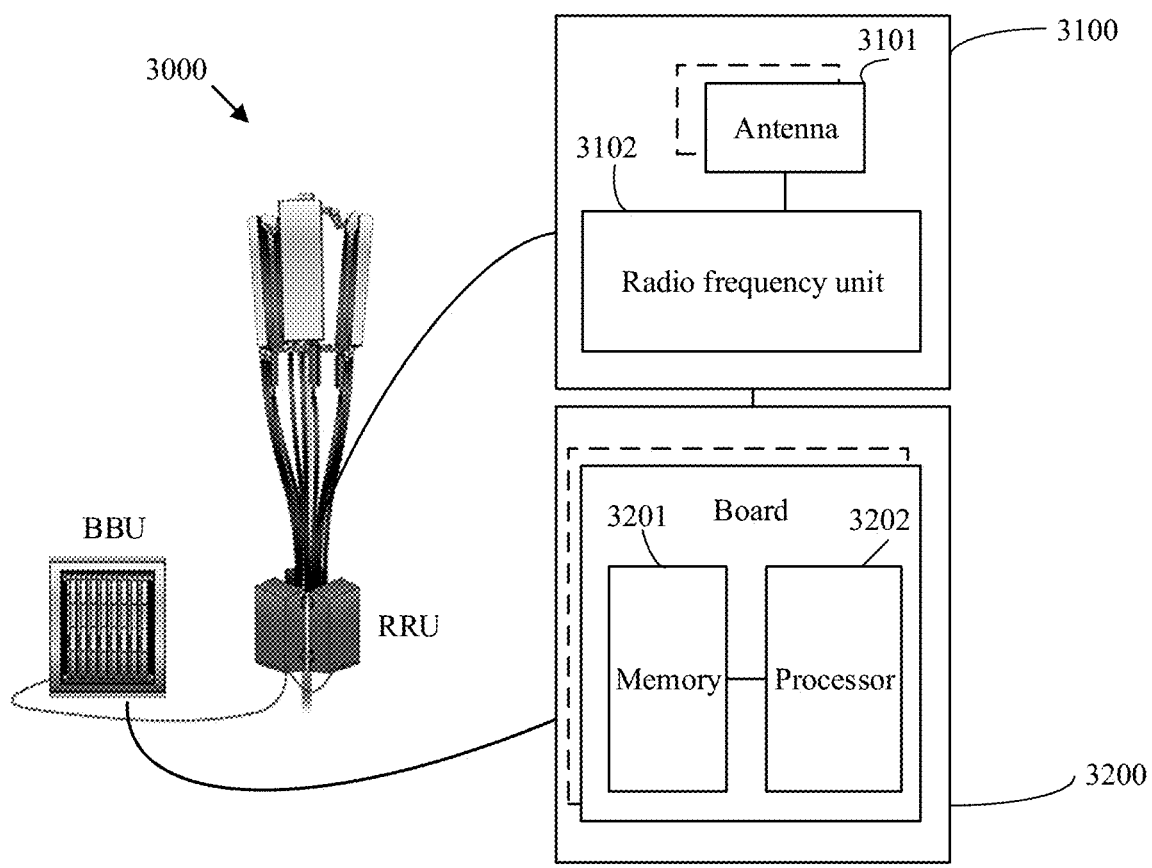
FIG. 5 is a diagram of a network device according to an embodiment of this application.

It should be further understood that when the communications apparatus 1000 is a network device, the transceiver unit in the communications apparatus 1000 may correspond to an RRU 3100 in a base station 3000 shown in FIG. 5, and the processing unit 1100 in the communications apparatus 1000 may correspond to a BBU 3200 or a processor 3202 in the base station 3000 shown in FIG. 5.

It should be further understood that when the communications apparatus 1000 is a chip disposed in a network device, the transceiver unit 1200 in the communications apparatus 1000 may be an input/output interface.

FIG. 4 is a diagram of a terminal device 2000 according to an embodiment of this application. The terminal device 2000 may be applied to the system shown in FIG. 1, and perform a function of the terminal device in the foregoing method embodiment. As shown in FIG. 4, the terminal device 2000 includes a processor 2010 and a transceiver 2020. Optionally, the terminal device 2000 further includes a memory 2030. The processor 2010, the transceiver 2002, and the memory 2030 may communicate with each other through an internal connection channel to transmit a control signal and/or a data signal. The memory 2030 is configured to store a computer program. The processor 2010 is configured to invoke the computer program from the memory 2030 and run the computer program to control the transceiver 2020 to receive and send a signal. Optionally, the terminal device 2000 may further include an antenna 2040, configured to send, by using a radio signal, uplink data or uplink control signaling output by the transceiver 2020.

The processor 2010 and the memory 2030 may be combined into a processing apparatus. The processor 2010 is configured to execute program code stored in the memory 2030, to implement the foregoing function. In an implementation, the memory 2030 may be integrated with the processor 2010, or may be independent of the processor 2010. The processor 2010 may correspond to the processing unit in FIG. 3.

The transceiver 2020 may correspond to the transceiver unit in FIG. 3, and may also be referred to as a transceiver unit. The transceiver 2020 may include a receiver (or referred to as a receiver or a receiver circuit) and a transmitter (or referred to as a transmitter or a transmitter circuit). The receiver is configured to receive a signal, and the transmitter is configured to transmit a signal.

It should be understood that the terminal device 2000 shown in FIG. 4 can implement the processes related to the terminal device in the method embodiment shown in FIG. 2. Operations and/or functions of the modules in the terminal device 2000 are separately used to implement corresponding procedures in the foregoing method embodiment. For details, refer to the descriptions in the foregoing method embodiment. To avoid repetition, detailed descriptions are appropriately omitted herein.

The processor 2010 may be configured to perform an action that is implemented inside the terminal device and that is described in the foregoing method embodiment, and the transceiver 2020 may be configured to perform an action that is of sending or receiving data to or from a network device by the terminal device and that is described in the foregoing method embodiment. For details, refer to the descriptions in the foregoing method embodiment. Details are not described herein again.

Optionally, the terminal device 2000 may further include a power supply 2050, configured to supply power to various components or circuits in the terminal device.

In addition, the terminal device 2000 may further include one or more of an input unit 2060, a display unit 2070, an audio circuit 2080, a camera 2090, and a sensor 2100, to further improve a function of the terminal device. The audio circuit may further include a speaker 2082, a microphone 2084, and the like.

FIG. 5 is a diagram of a network device according to an embodiment of this application, for example, may be a diagram of a base station. A base station 3000 may be applied to the system shown in FIG. 1, and perform a function of the network device in the foregoing method embodiment. As shown in FIG. 5, the base station 3000 may include one or more radio frequency units such as a remote radio unit (RRU) 3100 and one or more baseband units (BBUs) (which may also be referred to as distributed units (DUs)) 3200. The RRU 3100 may be referred to as a transceiver unit, and correspond to the transceiver unit 1100 in FIG. 3. Optionally, the transceiver unit 3100 may also be referred to as a transceiver, a transceiver circuit, a transceiver, or the like, and may include at least one antenna 3101 and a radio frequency unit 3102. Optionally, the transceiver unit 3100 may include a receiving unit and a sending unit, the receiving unit may correspond to a receiver (or referred to as a receiver or a receiver circuit), and the sending unit may correspond to a transmitter (or referred to as a transmitter or a transmitter circuit). The RRU 3100 is mainly configured to: receive and send a radio frequency signal, and perform conversion between the radio frequency signal and a baseband signal, for example, configured to send indication information to a terminal device. The BBU 3200 is mainly configured to perform baseband processing, control the base station, and the like. The RRU 3100 and the BBU 3200 may be physically disposed together, or may be physically disposed separately, may be on a distributed base station.

The BBU 3200 is a control center of the base station, may also be referred to as a processing unit and may correspond to the processing unit 1200 in FIG. 3, and is mainly configured to implement a baseband processing function, for example, channel coding, multiplexing, modulation, and spectrum spreading. For example, the BBU (processing unit) may be configured to control the base station to perform the operation procedure related to the network device in the foregoing method embodiment, for example, generate the foregoing indication information.

In an example, the BBU 3200 may include one or more boards, and a plurality of boards may jointly support a radio access network (for example, an LTE network) of a single access standard, or may separately support radio access networks (such as an LTE network, a 5G network, or another network) of different access standards. The BBU 3200 further includes a memory 3201 and a processor 3202. The memory 3201 is configured to store necessary instructions and necessary data. The processor 3202 is configured to control the base station to perform a necessary action. For example, the processor 3202 is configured to control the base station to perform the operation procedure related to the network device in the foregoing method embodiment. The memory 3201 and the processor 3202 may serve one or more boards. In other words, a memory and a processor may be disposed on each board, or a plurality of boards may share a same memory and a same processor. In addition, a necessary circuit may be further disposed on each board.

It should be understood that the base station 3000 shown in FIG. 5 can implement the processes related to the network device in the method embodiment shown in FIG. 2. Operations and/or functions of the modules in the base station 3000 are separately used to implement corresponding procedures in the foregoing method embodiment. For details, refer to the descriptions in the foregoing method embodiment. To avoid repetition, detailed descriptions are appropriately omitted herein.

The BBU 3200 may be configured to perform an action that is implemented inside the network device and that is described in the foregoing method embodiment, and the RRU 3100 may be configured to perform an action that is of sending or receiving data to or from a terminal device by the network device and that is described in the foregoing method embodiment. For details, refer to the descriptions in the foregoing method embodiment. Details are not described herein again.

It should be understood that the base station 3000 shown in FIG. 5 is merely an embodiment of the network device, and should not constitute any limitation in the embodiments of this application. The method provided in the embodiments of this application may be applied to a network device of another architecture, for example, a network device including a CU, a DU, and an AAU. An architecture of the network device is not limited in the embodiments of this application.

An embodiment of this application further provides a processing apparatus, including a processor and an interface. The processor is configured to perform the method in any one of the foregoing method embodiments.

It should be understood that the foregoing processing apparatus may be one or more chips. For example, the processing apparatus may be a field-programmable gate array (FPGA), may be an application-specific integrated circuit (ASIC), may be a system on chip (SoC), may be a central processor unit (CPU), may be a network processor (NP), may be a digital signal processor (DSP), may be a micro controller unit (MCU), or may be a programmable logic device (PLD) or another integrated chip.

In an implementation process, operations in the foregoing methods can be implemented by using a hardware integrated logical circuit in the processor, or by using instructions in a form of software. The operations of the method disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the operations in the foregoing methods in combination with hardware of the processor. To avoid repetition, details are not described herein again.

It should be noted that the processor in the embodiment of this application may be an integrated circuit chip and has a signal processing capability. In an implementation process, operations in the foregoing method embodiments can be implemented by using a hardware integrated logical circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. It may implement or perform the methods, the operations, and logical block diagrams that are disclosed in the embodiments of this application. The general-purpose processor may be a microprocessor, or the processor may be any conventional processor or the like.

Operations of the methods disclosed with reference to the embodiments of this application may be directly performed and accomplished by a hardware decoding processor, or may be performed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the operations in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (sSRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described in this specification includes but is not limited to these and any memory of another proper type.

According to the method provided in the embodiments of this application, this application further provides a computer program product. The computer program product includes computer program code, and when the computer program code is run on a computer, the computer is enabled to perform the method in the embodiment shown in FIG. 2.

According to the method provided in the embodiments of this application, this application further provides a computer-readable medium. The computer-readable medium stores program code, and when the program code is run on a computer, the computer is enabled to perform the method in the embodiment shown in FIG. 2.

According to the method provided in the embodiments of this application, this application further provides a system, and the system includes the foregoing one or more terminal devices and the foregoing one or more network devices.

The network device and the terminal device in the foregoing apparatus embodiments fully correspond to the network device or the terminal device in the method embodiments. A corresponding module or unit performs a corresponding operation. For example, a communications unit (a transceiver) performs a receiving or sending operation in the method embodiment, and operations other than sending and receiving may be performed by a processing unit (a processor). For a function of a unit, refer to the corresponding method embodiment. There may be one or more processors.

Terminologies such as "component", "module", and "system" used in this specification are used to indicate computer-related entities, hardware, firmware, combinations of hardware and software, software, or software being executed. For example, a component may be, but is not limited to, a process that runs on a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

A person of ordinary skill in the art may be aware that, illustrative logical blocks (illustrative logical block) and operations (operation) described in the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the functions of various functional units in the foregoing embodiments may be implemented by using software, hardware, firmware, or any combination thereof. When software is used to implement the embodiments, the embodiments may be implemented completely or partially in a form of a computer program product. The computer program product includes one or more computer program instructions. When the computer program instructions (programs) are loaded and executed on the computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD), a semiconductor medium (for example, a solid-state drive (SSD)), or the like.

When the functions are implemented in the form of a software functional unit and sold or used as an independent product, the functions may be stored in a computer-readable storage medium. Based on such an understanding, the technical solutions of the embodiments of this application essentially, or the part contributing to the current technology, or some of the technical solutions may be implemented in a form of a software product. The software product is stored in a storage medium, and includes several instructions for instructing a computer device (which may be a personal computer, a server, or a network device) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely implementations of the embodiments of this application, but are not intended to limit the protection scope of this application. Any variation or replacement readily figured out by a person skilled in the art within the technical scope disclosed in the embodiments of this application shall fall within the protection scope of this application. Therefore, the protection scope of this application shall be subject to the protection scope of the claims.

What is claimed is:

1. A precoding matrix indicating method, comprising:
  receiving a first index;
  generating first indication information, wherein the first indication information indicates reported space domain vectors, reported frequency domain vectors and weighting coefficients used to construct a precoding matrix, wherein the first index is for determining the reported space domain vectors, the reported frequency domain vectors and the weighting coefficients; and
  sending the first indication information.

2. The method according to claim 1, wherein the first index indicates parameters L, p and $\beta$, wherein L is for determining a maximum quantity of the reported space domain vectors, p is for determining a maximum quantity of the reported frequency domain vectors, and $\beta$ is for determining a maximum quantity of the weighting coefficients.

3. The method according to claim 2, wherein the parameters L, p and $\beta$ are used for any one transport layer of a plurality of transport layers.

4. The method according to claim 2, wherein the correspondence between the first index and values of the parameters L, p and $\beta$ is preconfigured.

5. The method according to claim 2, wherein the correspondence between the first index and the values of the parameters L, p and $\beta$ includes one of the following:
  when the first index comprises a first index value, L=2, p=1/4, $\beta$=1/4,
  when the first index comprises a second index value, L=2, p=1/4, $\beta$=1/2,
  when the first index comprises a third index value, L=4, p=1/4, $\beta$=1/4,
  when the first index comprises a fourth index value, L=4, p=1/4, $\beta$=1/2,
  when the first index comprises a fifth index value, L=4, p=1/2, $\beta$=1/2,
  when the first index comprises a sixth index value, L=6, p=1/4, $\beta$=1/2, or
  when the first index comprises a seventh index value, L=6, p=1/4, $\beta$=3/4.

6. The method according to claim 5, wherein the maximum quantity of the reported space domain vectors is L.

7. The method according to claim 5, wherein the maximum quantity of the reported frequency domain vectors is $M=\lceil p\times(N_3/R)\rceil$, wherein R is a preconfigured value, $N_3$ is a length of a reported frequency domain vector.

8. The method according to claim 7, wherein the maximum quantity of the weighting coefficients is $\lceil \beta \times 2LM \rceil$.

9. A communications apparatus, comprising:
  at least one processor configured with processor-executable instructions to perform operations including:
  receiving a first index;
  generating first indication information, wherein the first indication information indicates reported space domain vectors, reported frequency domain vectors and weighting coefficients used to construct a precoding matrix, wherein the first index is for determining the reported space domain vectors, the reported frequency domain vectors and the weighting coefficients; and
  sending the first indication information.

10. The communications apparatus according to claim 9, wherein the first index indicates parameters L, p and $\beta$, wherein L is for determining a maximum quantity of the reported space domain vectors, p is for determining a maximum quantity of the reported frequency domain vectors, and $\beta$ is for determining a maximum quantity of the weighting coefficients.

11. The communications apparatus according to claim 10, wherein the parameters L, p and $\beta$ are used for any one transport layer of a plurality of transport layers.

12. The communications apparatus according to claim 10, wherein the correspondence between the first index and values of the parameters L, p and $\beta$ is preconfigured.

13. The communications apparatus according to claim 10, wherein the correspondence between the first index and the values of the parameters L, p and $\beta$ includes one of the following:
  when the first index comprises a first index value, L=2, p=1/4, $\beta$=1/4,
  when the first index comprises a second index value, L=2, p=1/4, $\beta$=1/2,
  when the first index comprises a third index value, L=4, p=1/4, $\beta$=1/4,
  when the first index comprises a fourth index value, L=4, p=1/4, $\beta$=1/2,
  when the first index comprises a fifth index value, L=4, p=1/2, $\beta$=1/2, when the first index comprises a sixth index value, L=6, p=1/4, β=1/2, or when the first index comprises a seventh index value, L=6, p=1/4, β=3/4.

14. The communications apparatus according to claim 13, wherein the maximum quantity of the reported space domain vectors is L.

15. The communications apparatus according to claim 13, wherein the maximum quantity of the reported frequency domain vectors is M=[p ×($N_3$/R)], wherein R is a preconfigured value, $N_3$ is a length of a reported frequency domain vector.

16. The communications apparatus according to claim 15, wherein the maximum quantity of the weighting coefficients is [β×2LM].

17. A non-transitory computer-readable media storing computer instructions that configure at least one processor, upon execution of the instructions, to perform the following steps:

receiving a first index;

generating first indication information, wherein the first indication information indicates reported space domain vectors, reported frequency domain vectors and weighting coefficients used to construct a precoding matrix, wherein the first index is for determining the reported space domain vectors, the reported frequency domain vectors and the weighting coefficients; and sending the first indication information.

18. The non-transitory computer-readable media according to claim 17, wherein the first index indicates parameters L, p and β, wherein L is for determining a maximum quantity of the reported space domain vectors, p is for determining a maximum quantity of the reported frequency domain vectors, and β is for determining a maximum quantity of the weighting coefficients.

19. The non-transitory computer-readable media according to claim 18, wherein the parameters L, p and β are used for any one transport layer of a plurality of transport layers.

20. The non-transitory computer-readable media according to claim 18, wherein the correspondence between the first index and values of the parameters L, p and β is preconfigured.

21. The non-transitory computer-readable media according to claim 18, wherein the correspondence between the first index and the values of the parameters L, p and β includes one of the following:

when the first index comprises a first index value, L=2, p=1/4, β=1/4, when the first index comprises a second index value, L=2, p=1/4, β=1/2, when the first index comprises a third index value, L=4, p=1/4, β=1/4, when the first index comprises a fourth index value, L=4, p=1/4, β=1/2, when the first index comprises a fifth index value, L=4, p=1/2, β=1/2, when the first index comprises a sixth index value, L=6, p=1/4, β=1/2, or when the first index comprises a seventh index value, L=6, p=1/4, β=3/4.

22. The non-transitory computer-readable media according to claim 21, wherein the maximum quantity of the reported space domain vectors is L.

23. The non-transitory computer-readable media according to claim 21, wherein the maximum quantity of the reported frequency domain vectors is M=[p×($N_3$/R)], wherein R is a preconfigured value, $N_3$ is a length of a reported frequency domain vector.

24. The non-transitory computer-readable media according to claim 23, wherein the maximum quantity of the weighting coefficients is [β×2LM].

* * * * *